(12) United States Patent
Wesolowski et al.

(10) Patent No.: US 12,500,001 B2
(45) Date of Patent: Dec. 16, 2025

(54) SYSTEM AND METHOD FOR MEDICAL IMAGING USING VIRTUAL REALITY

(71) Applicants: John C. Huffman, Portland, OR (US); LUXSONIC TECHNOLOGIES, INC., Saskatoon (CA)

(72) Inventors: Michal Wesolowski, Saskatoon (CA); John C. Huffman, Portland, OR (US); Arjun Puri, Saskatoon (CA); Avez Rizvi, Brownsville, TX (US)

(73) Assignee: LUXSONIC TECHNOLOGIES, INC., Saskatoon (CA)

( * ) Notice: Subject to any disclaimer, the term of this patent is extended or adjusted under 35 U.S.C. 154(b) by 396 days.

(21) Appl. No.: 18/021,518

(22) PCT Filed: Aug. 27, 2021

(86) PCT No.: PCT/US2021/048102
§ 371 (c)(1),
(2) Date: Feb. 15, 2023

(87) PCT Pub. No.: WO2022/047261
PCT Pub. Date: Mar. 3, 2022

(65) Prior Publication Data
US 2024/0021318 A1    Jan. 18, 2024

Related U.S. Application Data

(60) Provisional application No. 63/072,021, filed on Aug. 28, 2020.

(51) Int. Cl.
*G16H 50/50*    (2018.01)
*G06F 3/01*    (2006.01)
(Continued)

(52) U.S. Cl.
CPC ............. *G16H 50/50* (2018.01); *G06F 3/013* (2013.01); *G06T 17/00* (2013.01); *G06V 10/25* (2022.01);
(Continued)

(58) Field of Classification Search
CPC ........ G16H 50/50; G16H 50/20; G16H 80/00; G06H 30/20; G06H 30/40; G06V 10/25; G06V 10/44; G06F 3/013; G06T 17/00
(Continued)

(56) References Cited

U.S. PATENT DOCUMENTS 6,556,724 B1    4/2003  Chang et al.
6,938,211 B1    8/2005  Chang et al.
(Continued)

OTHER PUBLICATIONS

Brossard, C., et al., MP3: Medical Software for Processing Multi-Parametric Images Pipelines, Frontiers in Neuroinformatics, Nov. 2020, pp. 1-10, vol. 14.

(Continued)

*Primary Examiner* — Gabriel I Garcia
(74) *Attorney, Agent, or Firm* — Eleanor Musick; Torrey Pines Law Group PC

(57) ABSTRACT

A medical imaging system includes a workstation and software configured for accessing medical image data from a database and generating one of more of 1D, 2D, 3D and 4D representations of the medical image data on one or more virtual reality imaging devices, where the virtual display is manipulatable by a user through a user interface associated with the virtual reality imaging device.

40 Claims, 14 Drawing Sheets

(51) Int. Cl.
| | |
|---|---|
| *G06T 17/00* | (2006.01) |
| *G06V 10/25* | (2022.01) |
| *G06V 10/44* | (2022.01) |
| *G16H 30/20* | (2018.01) |
| *G16H 30/40* | (2018.01) |
| *G16H 50/20* | (2018.01) |
| *G16H 80/00* | (2018.01) |

(52) U.S. Cl.
CPC ............ *G06V 10/44* (2022.01); *G16H 30/20* (2018.01); *G16H 30/40* (2018.01); *G16H 50/20* (2018.01); *G16H 80/00* (2018.01)

(58) Field of Classification Search
USPC ........................................................ 382/128
See application file for complete search history.

(56) References Cited

U.S. PATENT DOCUMENTS

| | | | |
|---|---|---|---|
| 10,275,927 | B2 | 4/2019 | Kuhn et al. |
| 10,368,817 | B2 | 8/2019 | Kreeger et al. |
| 10,417,804 | B2 | 9/2019 | Kuhn et al. |
| 10,586,400 | B2 | 3/2020 | Douglas |
| 10,679,402 | B2 | 6/2020 | Kuhn et al. |
| 10,713,856 | B2 | 7/2020 | Lee et al. |
| 10,838,210 | B2 | 11/2020 | Robaina et al. |
| 10,957,442 | B2 | 3/2021 | Kalafut et al. |
| 11,727,827 | B2 * | 8/2023 | Jarc .................. G09B 23/30 |
| 2011/0109650 | A1 | 5/2011 | Kreeger et al. |
| 2013/0189663 | A1 * | 7/2013 | Tuchschmid .......... G09B 23/28 |
| | | | 434/262 |
| 2018/0078313 | A1 | 3/2018 | Comaniciu et al. |
| 2019/0117888 | A1 | 4/2019 | Burkholz et al. |
| 2019/0183591 | A1 | 6/2019 | Johnson et al. |
| 2019/0207812 | A1 * | 7/2019 | Li ........................ H04L 41/12 |
| 2020/0042359 | A1 * | 2/2020 | Zhang .................. G06F 9/5055 |
| 2020/0126661 | A1 | 4/2020 | Flexman et al. |
| 2020/0219262 | A1 | 7/2020 | Hsiao et al. |
| 2022/0037018 | A1 * | 2/2022 | Goede .................. G06F 18/251 |

OTHER PUBLICATIONS

Do, H., et al., Augmented Radiologist Workflow Improves Report Value and Saves Time: A Potential Model for Implementation of Artificial Intelligence, Acad Radiol, Jan. 2020, pp. 1-16.

Efanov, J., et al., Virtual Surgical Planning: The Pearls and Pitfalls, www.PRSGlobalOpen.com, 2018, pp. 1-9.

Hasani, N., Effect of Implementation of Picture Archiving and Communication System on Radiologist Reporting Time and Utilization of Radiology Services: A Case Study in Iran, Journal of Digital Imaging, Jan. 2, 2020, pp. 595-601.

* cited by examiner

SYSTEM AND METHOD FOR MEDICAL IMAGING USING VIRTUAL REALITY

RELATED APPLICATIONS

This application is a 371 national stage filing of International Application No. PCT/US2021/048102, filed Aug. 27, 2021, which claims the benefit of the priority of U.S. Application No. 63/072,021, filed Aug. 28, 2020, each of which is incorporated herein by reference in its entirety.

FIELD OF THE INVENTION

The present invention relates to a system and method for storing and viewing medical images, and interaction and collaboration for diagnostic evaluation of the images, and most particularly to system architecture and software for use in accessing, manipulating, and reviewing medical images.

BACKGROUND

Radiology is one of the core departments at most hospitals. Medical imaging is a valuable tool in accurate disease diagnosis and improved treatment. Radiology imaging utilization continues to rise in spite of major efforts aimed at reducing the use of such techniques, with key concerns being increased costs and potential unintended harm to patients from over-exposure to radiation and increased risk of cancer. Estimates suggest that as much as 30% of imaging examinations may be unnecessary or redundant, costing over $30B per year in the United States alone. In the U.S. in 2019, health spending accounted for 17.7% of the gross domestic product (GDP). Given a projected price growth of over 5% over the next decade for medical goods and services according to National Health Expenditure (NHE) Data, improved efficiency in the use of these procedures to accurately diagnose conditions and plan care regimens for patients is of critical importance to the healthcare industry, and the economy as a whole.

Further exacerbating the challenges to improved healthcare efficiency is that complex diagnoses are rarely made with imaging information alone, and even imaging studies are rarely performed using a single modality. Frequently, multiple imaging technologies are combined to provide different information of the underlying pathology, for example x-rays, CT (computed tomography), MR (magnetic resonance), US (ultrasound), NM (nuclear medicine), etc. Each of these individual modalities provide a different dimension of input to the diagnosing physician about the underlying condition of the patient under review. Combined with laboratory information, pathology information, patient co-morbidities (other disease processes in the same patient), patient clinical history, family history, genomics, etc., the environments required to effectively present this information in a coherent way, contextualized for the physician's use, have become extremely complex and in many cases, are constructed ad hoc, or, at a minimum, rapidly evolving.

Since the transition of imaging review from film to digital environments, the radiology reading environment has rapidly evolved. For many years, through the 80's and 90's, these systems largely focused on the ability to correctly present the imaging information in digital form for review and diagnosis by a reading physician. This process required studies to ensure the correctness of the data presentation as well as to measure the efficacy of digital reading compared to the legacy analog processes. There are now stringent requirements on the capabilities of display systems used for diagnosis. In parallel, the tremendous reduction in the cost of storage and computing power led to rapid scaling of the amount of information, and complexity of modeling and visualization that could be performed on the underlying data. This, in turn, has led to increased complexity in how the data can be optimally presented for interpretability. It is highly desirable to present 2D, 3D and 4D rendering of captured data, frequently fusing information from multiple sources into a single presentation, to enable the reading physician to visualize complex processes in disease manifestation.

This rapid expansion of imaging capabilities, augmented by non-imaging data from multiple systems, such as the EMR (Electronic Medical Record), pathology, genomics, etc., and the need to present historical study information for comparison, has forced the diagnosing physician to employ ever more complex reading scenarios, called "protocols", that are designed on a per purpose basis to present the relevant information in a contextually optimal form for the reading physician to interpret. These protocols, however, can manifest in many different configurations for computer layouts to present the differing formats and renderings of the consolidated data.

Compounding these challenges is the cost of the physical space occupied by the radiology reading room—on the order of $400 per square foot in hospitals—and the additional cost of accommodating expanded imaging capabilities.

Imaging technologies are evolving rapidly. Augmented reality (AR) and virtual reality (VR) technologies have been around for decades, but the advent of relatively inexpensive, extremely powerful processors and large capacity memory has led to a golden age in the adoption of these methods in many industries. The healthcare industry has fallen behind in exploiting these new technologies, due in part to the heavily regulated domain in which it exists, where changes must be carefully evaluated for potential risks to patient safety. These evaluation processes are time consuming and expensive—requiring skilled professionals to evaluate the proposed new methods and technology integration in parallel with current best practices to prove efficacy. Consequently, in spite of the substantial benefits they would confer, the penetration of these new AR and VR technologies has been minimal and superficial in the clinical domain.

BRIEF SUMMARY

According to embodiments described herein, AR and VR technologies are integrated with medical imaging. The inventive system, referred to as "SieVRt", is a comprehensive, extensible clinical environment designed to integrate and apply AR and VR technologies to medical imaging applications. By allowing the system to be configured to use existing canonical display and analysis methods, the immediate difficulty in introducing the new methods into a validated clinical environment is eliminated. Through the integration capabilities of an abstracted application integration layer, new AR, VR and AI technologies and techniques can be seamlessly introduced on a case by case basis enabling the deployment and comprehensive evaluation of these new methods in a validated clinical environment.

The SieVRt solution eliminates dependence on data presentation from complex and expensive hardware configurations. By virtualizing the visualization and interaction environment, complex viewing and interaction configurations that would not even be possible in the canonical, workstation-oriented approach in the industry today are possible. Dynamic viewing modes such as true 3D and 4D presentation and interaction, multi-dimensional data fusion, holographic presentation, etc. are no more complex to configure than a standard 2d picture or video presentation. These advanced visualization and interaction configurations greatly increase the information throughput to the user(s) and thereby significantly improve the accuracy of data evaluation and diagnoses, by combining complex, multi-sourced data and presenting it in an optimized, intuitive format for interpretation. Current systems in the industry rely on multiple static computer displays of tabular or limited graphical presentation that must be combined and interpreted in the mind of the user(s).

In one aspect of the invention, a medical imaging system comprises a workstation and software configured for accessing medical image data from a database and generating one of more of 1D, 2D, 3D and 4D representations of the medical image data on one or more virtual reality imaging devices, wherein the representations are manipulatable through one or more user interface. An important aspect of the inventive approach is its focus on workflows and the ability to optimize diagnostic radiology workflow through the use of an adaptable and reconfigurable virtual reading room environment.

In another aspect of the invention, a medical imaging system for optimizing workflow includes: a data services module configured to receive medical data from one or more data source; a worklist module in communication with the data services module and configured for presenting at least one queue of work to be performed within the workflow; a view controller module in communication with the data services module and the worklist module, the view controller module configured to receive the workflow and the medical data and apply one or more protocol for processing the medical data based on the worklist, the view controller module configured to execute one or more of a component for processing the medical data, a component for rendering multi-dimensional models of the medical data, a component for interpretation of medical data, and generate an output comprising a display configuration; and one or more virtual reality (VR) imaging devices in communication with the view controller module and configured for receiving the display configuration and generating a virtual display of one of more of 1D, 2D, 3D and 4D representations of the medical data, wherein the virtual display is manipulatable by a user through a user interface associated with the one or more virtual reality imaging devices. The medical data may include one or more of DICOM, PACS, RIS and EMR data.

The one or more protocol may be stored within a protocol component within the view controller module, and the view controller module is further configured to track new configurations corresponding to manipulations of the virtual display by the user and add the new configurations to the protocol component. In some embodiments, the new configurations may be generated by a learning machine component. The view controller module may be further configured to detect features within the medical data. One or more portions of the virtual display may be reconfigurable via one or more of the user interface and the workflow. Functionality of the user interface may be extendable through API integration of external programs.

In some embodiments, the worklist module can be configured to present different queues of work for different users. The system may further include a communications component for engaging one or more additional users in a collaboration session. In some applications, the one or more additional users may be students, and an initiator of the collaboration session can optionally select data and data configurations and presentations for sharing within the collaboration session. In other applications, the collaboration session can be initiated for the purpose of communication of medical information and diagnoses to one or more patients, where the initiator of the collaboration session can optionally select data and data configurations and presentations for sharing within the collaboration session. In still other applications, the collaboration session can be initiated for the purpose of professional consultation on an interpretation of a medical condition. The collaboration session can be initiated for the purpose of a group consultation on one or more medical cases, conditions, and technologies.

The user interface may include an eye-tracking function, where the eye-tracking function is configured to adjust a viewing angle of the virtual display according to a detected viewing angle. The user interface may also include a plurality of digital image manipulation tools configured for one or a combination of highlighting, marking, selecting, extracting, annotating, moving, segmenting, inverting, splitting, zooming, and flipping all or portions of a displayed object. The plurality of digital image manipulation tools may further include measurement tools for selecting a region of interest within the displayed object and measuring the selected region of interest. The user interface may also include a gesture-tracking function, and where at least a portion of the plurality of digital image manipulation tools is configured to respond to gestures. In some implementations, the displayed object can be a 3D or 4D object and the plurality of digital image manipulation tools are configured to define a 3D or 4D voxel-based region of interest (ROI).

In another aspect of the invention, a medical imaging system for executing workflow includes: a data services module configured to receive medical and operational data from one or more sources; a worklist module in communication with the data services module, configured for presentation of at least one queue of work to be performed within the workflow; a view controller module in communication with the data services and worklist modules, the view controller configured to apply one or more protocols for the processing and presentation of the medical data for interpretation, and the generation of an output comprising a display configuration; one or more virtual reality (VR) imaging devices in communication with the view controller module and configured to receive the display configuration and to generate a virtual display of one or more displayed object comprising one or a combination of 1D, 2D, 3D and 4D representations of the medical data; and a user interface associated with the one or more virtual reality imaging devices, the user interface configured to control features of the display configuration. The medical data may include one or more of DICOM, PACS, RIS and EMR data.

The one or more protocol may be stored within a protocol component within the view controller module, and the view controller module is further configured to track new configurations corresponding to manipulations of the virtual display by the user and add the new configurations to the protocol component. In some embodiments, the new configurations may be generated by a learning machine component. The view controller module may be further configured to detect features within the medical data. One or more portions of the virtual display may be reconfigurable via one or more of the user interface and the workflow. Functionality of the user interface may be extendable through API integration of external programs.

In some embodiments, the worklist module can be configured to present different queues of work for different users. The system may further include a communications component for engaging one or more additional users in a collaboration session. In some applications, the one or more additional users may be students, and an initiator of the collaboration session can optionally select data and data configurations and presentations for sharing within the collaboration session. In other applications, the collaboration session can be initiated for the purpose of communication of medical information and diagnoses to one or more patients, where the initiator of the collaboration session can optionally select data and data configurations and presentations for sharing within the collaboration session. In still other applications, the collaboration session can be initiated for the purpose of professional consultation on an interpretation of a medical condition. The collaboration session can be initiated for the purpose of a group consultation on one or more medical cases, conditions, and technologies.

The user interface may include a plurality of digital image tools configured for one or a combination of manipulation, processing, annotation, and measurement of features within the one or more displayed object. The tools may be configured for one or a combination of processing, highlighting, marking, selecting, extracting, annotating, moving, segmenting, inverting, splitting, zooming, and flipping all or portions of a displayed object. The user interface may include a gesture-tracking function, where at least a portion of the plurality of digital image tools is configured to respond to gestures. The digital image tools may be expandable through registration or inclusion of one or more new functionality through the use of defined interfaces. The digital image tools further include measurement tools for selecting a region of interest within the displayed object and measuring the selected region of interest using configured functions designed for clinical interpretation of medical data. The measurement tools may include a tool for measuring pixel values and converting pixel values to clinical values. The digital image tools may be configured to be constrained to one or more selected regions of interest within the displayed object. In some implementations, the displayed object can be a 3D or 4D object and the plurality of digital image manipulation tools are configured to define a 3D or 4D voxel-based region of interest.

DETAILED DESCRIPTION OF EXEMPLARY EMBODIMENTS

Figure 1:
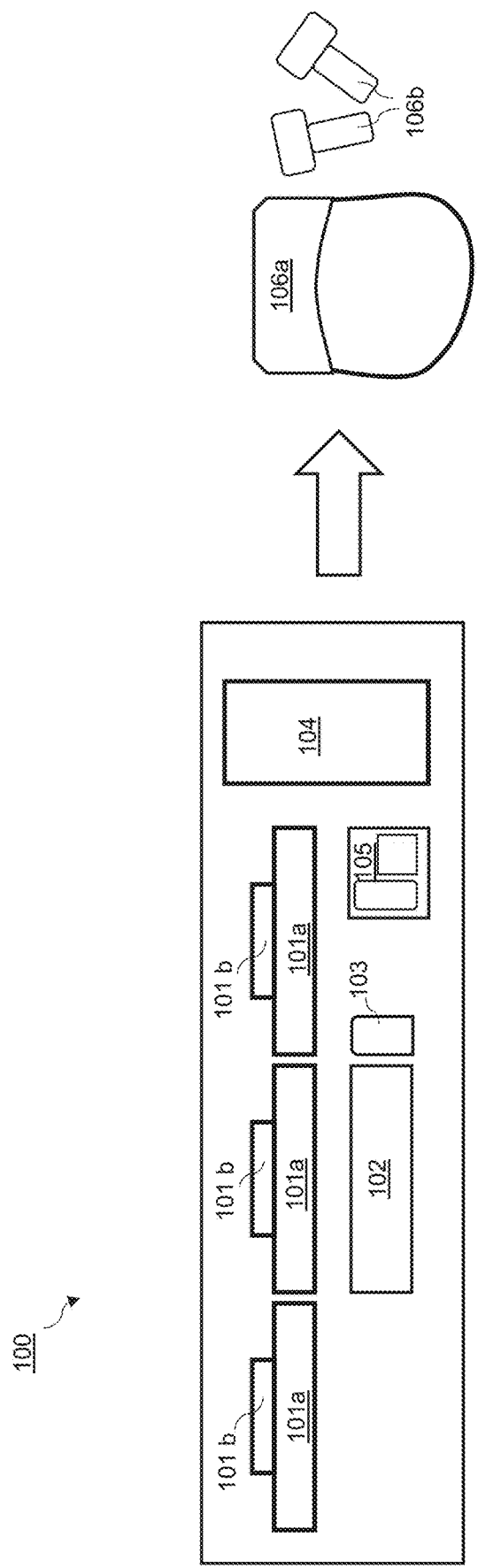
FIG. 1 is a diagram of the basic components of a traditional radiology reading environment.

Physical reading rooms that are widely used in hospitals and medical facilities are constrained by hardware. The inventive SieVRt virtual radiology reading room and methods of use disclosed herein replace the current paradigm with a virtualized environment that can be hosted on the cloud and is infinitely configurable. Not only does this paradigm encompass any and all possible hardware configurations, but it also enables new configurations capable of implementing components that could not be instantiated in a hardware environment using existing approaches. As will be further detailed with reference to the accompanying drawings, through a set of interfaces and adapters, the SieVRt Data Services component can be connected to any data source, e.g., PACS, RIS, EMR or any other repository. These data services are fed into a Worklist Service that creates a real-time prioritized worklist for role-based users—technicians, physicians, radiologists, etc. Upon selection of a study for review, the study and associated data are accessed by the SieVRt View Controller that looks up the configured or default configuration for optimized display of this type of study. The controller then configures and instantiates this view, within the virtual environment, with the study information displayed as directed.

Referenced components (imaging or data interaction and display components) are stored in component libraries that may be extended by new native or third party assets through the API/Adapter layer. New configurations can be specified by an active user and registered in the protocol library.

The SieVRt system is capable of monitoring users as they work to derive optimized configurations that can be associated with study types. These optimized configurations can be verified and validated and finally registered in the configuration library. This allows the system to "learn" optimal configurations based on use patterns combined with study characteristics, as well as adapt to changed preferences and/or new data sources and techniques. The inventive approach is highly flexible, allowing workflows to be configured based on roles. For example, a technician capturing an image may be presented with different data and configurations than would a GP or a radiologist looking at the same study.

New display paradigms that have no current physical hardware instantiation can be specified in the view component libraries. These can include hybrid 1D/2D/3D/4D displays integrating true 3D visualization that enable fusion and/or virtualized views that are not possible in a hardware-constrained environment. One example is dynamic holographic displays.

Definitions: Unless defined otherwise, all technical and scientific terms used herein have the plain and ordinary meaning as would be understood by a person of skill in the art. Unless expressly limited, where a term is provided in the singular, the description contemplates the plural of that term, i.e., one or more or a plurality. To provide a clarifying example, when an object is described, unless that object is expressly described as a "single" or "only one" of the object, "one or more object", "at least one object", and "a plurality of objects" is also encompassed by that term.

The following terms are used in the description of the inventive system:

"Digital Imaging and Communication in Medicine" ("DICOM"): This is the primary file format used in the healthcare industry to store a series of medical images such as x-rays, ultrasounds, Mills, and other images used in medicine. A DICOM image contains a header with metadata that includes information such as bit depth, size, dimensions, slice thickness, spacing between slices, and the modality used to create the DICOM file. The metadata are essential for 3D image reconstruction. The headers and metadata may also include date, patient data, physician ID, study ID, series data, and other imaging system settings.

"Model-View-Controller" ("MVC"): An architecture design that implements the idea that classes that interact with the user (view), will send information to the controller that manipulates the information set of classes (model).

"Graphical User Interface" ("GUI"): This is the visual depiction of an interface, which the user will be able to see, interact with, and affect.

"Picture Archiving and Communication System" ("PACS"): a medical imaging technology that provides economical storage and convenient access to images from multiple modalities (source machine types). PACS integrates with imaging modalities such as radiography, magnetic resonance images (MM), Computed Tomography Scan (CT), sonography and Nuclear Medicine (NM) and other similar technologies.

"Radiological Information System" ("RIS"): a core system for the electronic management of imaging departments. The major functions of the MS can include patient scheduling, resource management, examination performance tracking, reporting, results distribution, and procedure billing.

"Electronic Medical Record" ("EMR"): a digital version of the paper charts in the clinician's office, containing information about a patient's health history, such as diagnoses, medicines, tests, allergies, immunizations, and treatment plans. Electronic medical records can be seen by all healthcare providers who are taking care of a patient and can be used by them to help make recommendations about the patient's care. Also called "EHR" and Electronic Health Record".

"Workflow" Workflow is the sequence of individual steps necessary to carry out a complete process in a radiology department. Over recent years, workflow has been strongly affected by new technologies such as MS, PACS, speech recognition, electronic signature, and digital modality (e.g., computed radiography [CR] and direct radiography [DR].

Referring to FIG. IA, a basic radiology reading environment 100 typically consists of from one to four monitors 101a mounted on an adjustable ergonomic mounting system 101b. One of the monitors may optionally be used as a navigation aid to present the entirety of the contextual information available for review. In many systems, this information is presented as a separate frame on the diagnostic monitor 101a, which can be occluded when not required. However, it is highly desirable to have a persistent navigational display, especially in complex information scenarios. Monitor 101a is typically a monitor that meets standards requirements for presentation of the underlying imaging information and can be configured by partitioning the screen real estate into one or more frames containing different views or information relevant to the protocol in use. The reading physician can select different information from the navigational context (menus, icons, images, etc.), for display in the diagnostic context using conventional user interface tools, which may include a keyboard 102 and mouse/trackball 103. A computer workstation 104 is used as a local data storage device and as an interface device that is connected to Picture Archiving and Communication Systems (PACS), Radiology Information Systems (RIS) and Hospital Information Systems (RIS) amongst others. Additional peripherals 105, such as a telephone, dictation microphone, mobile devices, are also often present in a traditional reading room environment. This entire hardware assembly can be virtualized using software and displayed as a virtual reading environment using an extended reality (XR) head mounted display (HMD) 106a and interacted with using corresponding input devices 106b.

Many variations in hardware configuration can be implemented depending on the requirements deemed of highest priority for the underlying diagnostic requirements. For example, a physician evaluating a broken arm would likely only require a single monitor that can present an x-ray. Another example is screening for mammography, where the required protocol requires the review of four or eight, extremely high-resolution views of the breast. This protocol requires anywhere from two to four high resolution monitors to meet guideline requirements. Another example covering many scenarios is oncology care (cancer), where many different imaging modalities can be used, with complicated 3D rendering of CT and MR data, frequently fused with nuclear medicine information. Other examples are radiation therapy planning, ultrasound examination for pregnancies, visualization for surgical planning, etc. Note that each of these complex protocols has an optimal presentation configuration of the contextual information relevant for the diagnosis at hand. Unfortunately, unless a site specializes in a single, consistent set of diagnostic protocols, when a physical manifestation of a hardware reading environment is decided upon, compromises must be made, which potentially can lead to sub-optimal, or at least, lower efficiency diagnostic efficacy.

The term "protocols" as used herein relates to the type of information required to perform the current diagnostic reading, and how it should be presented. With increasing frequency, protocols include more than just captured image data. It is common in the current diagnostic radiology environment to require rendered 3D and 4D views of data, sometimes fused (overlaid or modified with additional information) with other images or parameters, laboratory data, prior study reports and images, pathology information, etc. Beyond patient-specific data, in some settings, e.g., teaching, additional information that may be useful in a collaboration protocol is population data—data for other individuals with similar phenotypes, or data for individuals who are known to have a condition suspected in the case of the subject patient. One of the key problems in configuring diagnostic reading environments is that the expense of hardware, and complexity of configuration, combined with the variety of protocols at hand, preclude the ability to fully address every requirement and/or potential knowledge-discovery capacity. As a result, compromises must be made based on the hardware configurations at hand.

Besides the screen real estate required to adequately present the requisite data in contextually correct formats, there are a number of additional requirements imposed on the set up of the diagnostic reading room. Due to the deep detail captured in diagnostic images, ambient lighting must be controlled to avoid interfering with the how a reading physician interacts with the images. A sudden change in ambient lighting can cause an unconscious reaction of the eye, dilation, for example, that can diminish the ability to interpret the data presented. In addition, because of the fine detail captured, there are stringent requirements on the display characteristics of the screen. The screens must be calibrated and monitored so that the detail conveyed in the radiology image is being correctly displayed for interpretation. These considerations combined with the requirements of different protocols for how much data should be displayed for interpretation, lead to a set of environmental and hardware requirements on how the reading room is configured. Many sites select one, or possibly two hardware configurations—i.e., number and type of monitors, layout, etc., and use this setup for all radiology protocols. It is a compromise but is driven from the impracticality and expense of meeting the optimal requirements for all protocols that are used.

The inventive approach described herein addresses many, if not all, of the aforementioned compromises, while dramatically reducing the complexity and cost of the radiology reading environment. This approach is to virtualize the entire radiology reading environment. In addition, the approach addresses the ability to collaborate with non-local resources for the purposes of quality control in the capture of clinical data, consultation with remote specialists, communication with referring physicians, diagnosis and care presentation with patients, and any other scenarios requiring input from a non-local person or resource. As used herein, "virtualizing" means using an artificial digital environment that encapsulates all the stringent viewing requirements but allows effectively infinite flexibility in data presentation configuration so that each protocol can be presented optimally in the same system, with no incremental cost nor compromise. By migrating the complexity of the radiology reading room configuration to a software problem in a virtual space, only a single environment is required. This environment, however, has infinite configurability with little or no incremental hardware expense.

Figure 2:
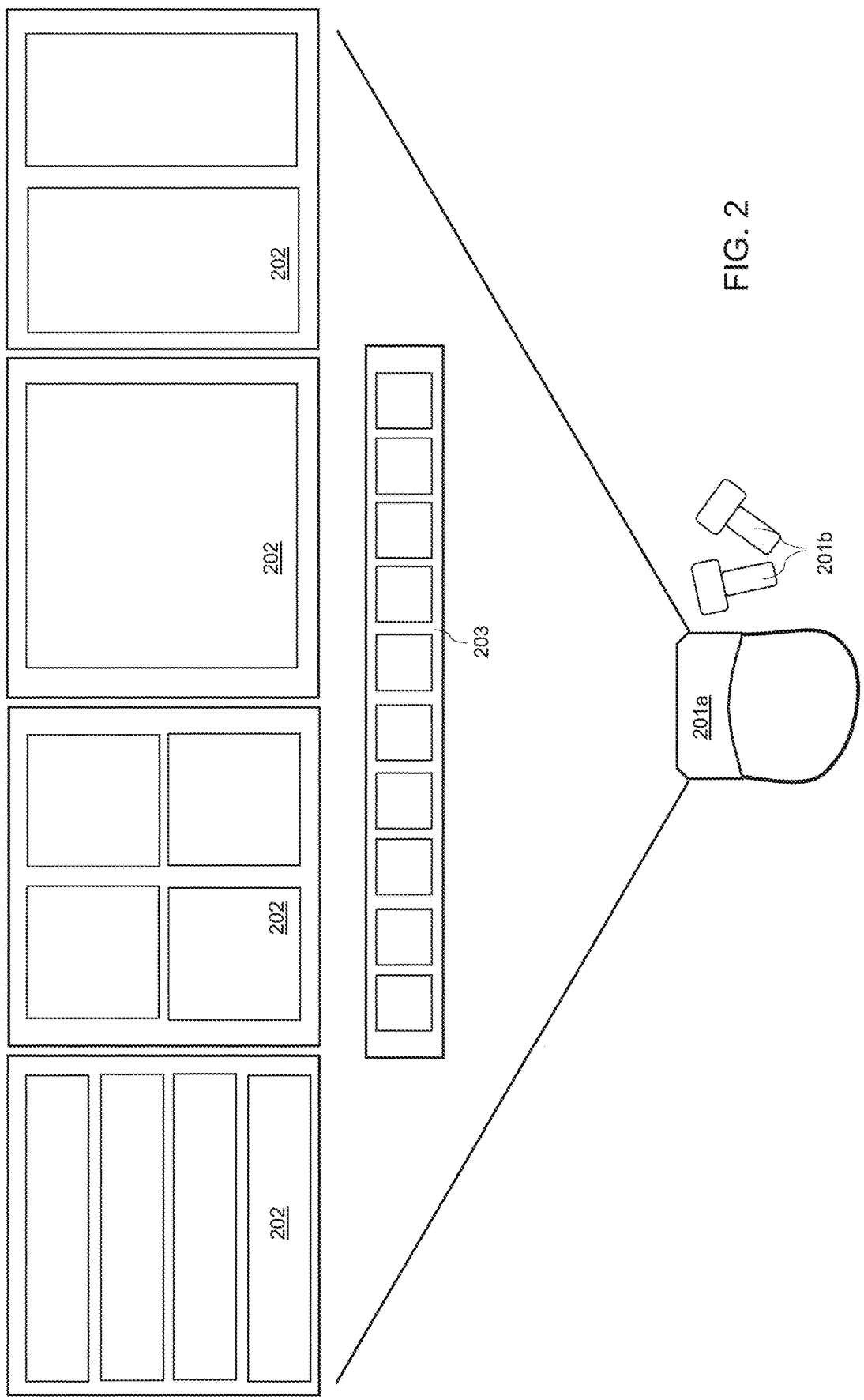
FIG. 2 illustrates an exemplary virtual reading room environment according to an embodiment of the inventive system.

The basic components of an exemplary embodiment of SieVRt's virtual reading room environment are shown in FIG. 2. In this infinitely configurable virtual environment for radiology, a user wearing an XR HMD 201a and using associated input devices 201b is able experience and interact with the SieVRt virtual reading room environment using any combination of their five senses. In its most basic form, this environment contains virtual monitors 202 that can be configured to display any type of medical imaging data. Any number of virtual monitors 202 can be spawned within the virtual reading environment. In the example illustrated in FIG. 2, a configuration with four virtual monitors 202 is shown. Each virtual monitor 202 can be individually configured by partitioning the screen real estate into one or more frames containing different views or information relevant to the protocol in use. Any of these virtual monitors could also be used as a navigation aid to present the entirety of the contextual information available for review. Any of these virtual monitors could also be configured for use as an additional data display, for example, as a browser window to display data from the world wide web. These configurations can be changed in real time, using the SieVRt View Controller module 503, shown in FIG. 5 and discussed further below. Using input devices 201b, a user can interact with both the virtual monitors 202 and a user interface (UI) 203, which allows the user to select from an array of tools for interaction with the SieVRt virtual environment and the virtual monitors 201. This UI 203 is also highly configurable and can be changed in real time by the user or through the SieVRt View Controller.

The SieVRt system's ability to handle general purpose imaging, instantly reconfigure the system for arbitrarily complex information presentation configurations optimized for specific care plan scenarios, and the system's ability to be customized for individual patient scenarios, are key advantages of the inventive scheme.

The following examples provide illustrations of different implementations and applications of the inventive system and method.

Example 1: The Basic Workflow Pattern

Figure 5:
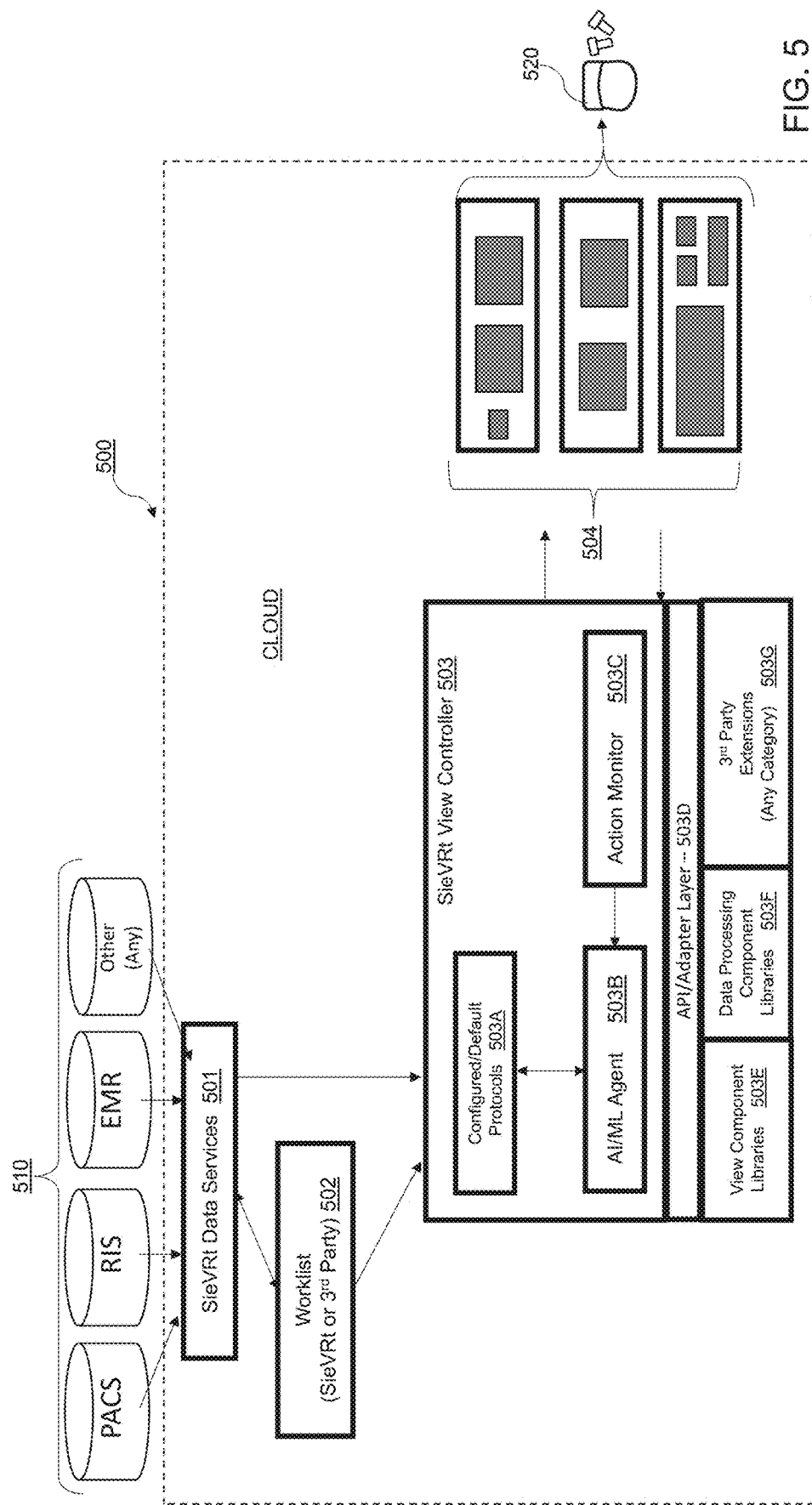
FIG. 5 is a diagram showing a basic workflow pattern to implement the capabilities of the inventive approach.

Referring to the system diagram of an exemplary SieVRt virtual radiology reading room environment 500 shown in FIG. 5, the SieVRt Data Services module 501 is configured using standard and custom data interfaces and brokers to all available data sources 510. In the illustrated embodiment, the components of the SieVRt environment 500 which can reside either on a local user workstation or all-in-one XR HMD, is accessible via standard internet communications protocols to enable access to users at many different locations. In other embodiments, all or some functions within the system may reside, with their supporting programs and interfaces, on dedicated servers, accessible via the internet. The data sources 510 include traditional PACS, RIS and EMR systems that are ubiquitous in the healthcare environment, but any data source can be included. These data sources may be server-based, cloud-based, or some combination thereof. It should be noted that while a separate database is shown in the figure associated with each data source, a single database may provide storage for multiple data sources and/or separate databases may provide access to the same or similar data sources.

The principal purpose of Data Services module 501 is to provide a well-defined, normalized and strongly-typed set of Application Programming Interfaces (APIs) between the rest of the SieVRt and integrated third party systems. This allows for seamless user interaction with the data while taking into account the myriad data representations used by different manufacturers or institutions that can frequently lead to misinterpretation of data and consequent patient safety considerations. The Data Services module normalizes data from any and all external sources to a semantically consistent schema. This is necessary to enable meaningful statistical analysis, AI application and comparisons of data. These analyses can lead to workflow modifications, care planning, alarm triggering, etc., so it is imperative that the data be correctly interpreted from a variety of sources.

The Worklist module 502 can be provided by SieVRt, or an integrated third-party component. This component presents the queue of work to be done for any role-based purpose. For example, this could be the list of studies to be reviewed by radiologists or sub-specialists, it could be the scheduled protocols at a modality for image capture to be used by a technician, or it could be a list of teaching cases for students, interns, or residents to review. Any queue of work processes to be performed for any purposes can be presented through Worklist module 502.

When a particular work item or study is selected from the Worklist module 502, it is passed to the SieVRt View Controller module 503, specifically, sub-component 503A, which is the Configured/Default Protocols component. Component 503A maintains a record of configured display protocols to use for specific study or work item types. For example, for a basic X-ray (XR) with a lateral and posterior-anterior view, a display with two side-by-side views might be specified. Another example could be for a mammography screening study (MG). For this protocol, the viewing environment is dictated by a national standards committee and consists of four simultaneous views that follow a sequence of different displays of the images for the interpreting radiologist to detect the presence (or absence) of cancer. Another example could be diagnostic MG, post screening. In this protocol, additional modality information, such as MR is frequently present and therefore requires a different configuration of displays for interpretation. Another example could be a CT study with multiple views. These studies are frequently presented as 2D stacks of images, and in some cases, a simulated 3D view can be generated from the 2D stacks. In the SieVRt environment, these standard views are easily replicated, but they can also be augmented by true 3D volumetric views in the virtual environment—something that cannot be done in a 2D workstation environment. Another example could be for an oncology study that contains CT and PET series data to be fused in a 3D display. The key point here is that the SieVRt system is not constrained by the hardware that is physically present in a radiology reading room. In the virtualized environment according to the inventive system, any configuration is possible without the need for additional workstations or displays.

The configurations listed in component 503A can be entirely or partially generic—such as a basic display pattern for any individual modality by default or specified to whatever degree is required based on the context of the study and availability of additional information or resources. For example, extended or third-party viewing modules can be added through a View Component Library 503E. This is a database of available display components that can be extended by third party additions. For example, there are a number of companies that produce advanced processing and display components for many conditions, e.g., nuclear medicine. Other examples may include software packages such as SPM (Statistical Parametric Mapping) or FSL (FMRIB Software Library), open-source software for analysis of brain imaging data. Selection of appropriate add-in functions will depend on the user's needs and will be apparent to those of skill in the art. These components, when integrated through View Library component 503E, are available on demand by the user, or for configuration in protocols. This capability enables an essentially unlimited flexibility and extensibility in data presentation paradigms.

Similarly, standard and extended, or third-party image, signal or other data processing methods can be integrated through the Data Processing Component Library 503F. These can be simple enhancement routines to detect edges, or CAD (computer assisted detection) methods to be used to detect specific features such as tumors, or advanced rendering techniques for 3D and 4D data presentation. Again, these are available on-demand to the reviewing user or can be incorporated into configured protocols and stored in component 503A.

Third Party Extensions Component 503G enables the integration of complex computational, data or viewing solutions either natively from SieVRt sources, or third-party solutions. For example, these could be advanced algorithms for the interpretation and presentation of pathology data, or the complex modeling of disparate data from different sources to produce an interpretable presentation to a user. One illustrative example of such complex modeling is disclosed in International Publication No. WO2018/165221 (The Regents of the University of California), in which a registered volumetric image of the brain can be generated using multiple data types of diverse modalities, e.g., fMRI and EEG.

Components 503E (View Component Libraries), 503F (Data Processing Component Libraries) and 503G (Third Party Extensions Libraries), integrated via API/Adapter Layer 503D, enable unlimited extensibility to the available resources of the SieVRt View Controller 503 to deploy rich environments for data presentation, interpretation, and interaction.

The output from the SieVRt View Controller module 503 is a specification for the display configuration of the selected work item or study. User View Component 504 is the Optimized Configured View from Configured Protocol and/or Study Information Constructed from Native and Extended UX Elements. This specification manifests in a virtualized view in the VR headset 520 that is optimized for the selected item. Once in this environment, View Component 504 provides the user with the ability to see, access and incorporate any additional information available to the SieVRt Data Services 501. View Component 504 enables the user to customize the environment for any purpose, and also allows the user to create new protocols or modify existing protocols and store them back into the Configured/Default Protocols library 503A. Within View Controller 503, new and/or optimized configurations can be "learned" through intelligent agent monitoring of the user(s) in AI/ML Agent component 503B. Action Monitor 503C tracks the performance of the system and any actions or modifications performed by the user for evaluation and potential improvement of existing protocols using a range of methods—statistical, through to machine learning methods. The methods used are existing libraries for statistical analysis, neural networks, and machine learning. Examples of these libraries include TensorFlow from GOOGLE®, or the MICROSOFT® Cognitive Toolkit (CNTK). The learned configurations and protocols are input into and stored in Configured/Default Protocols library 503A for recall and later use.

Figure 6:
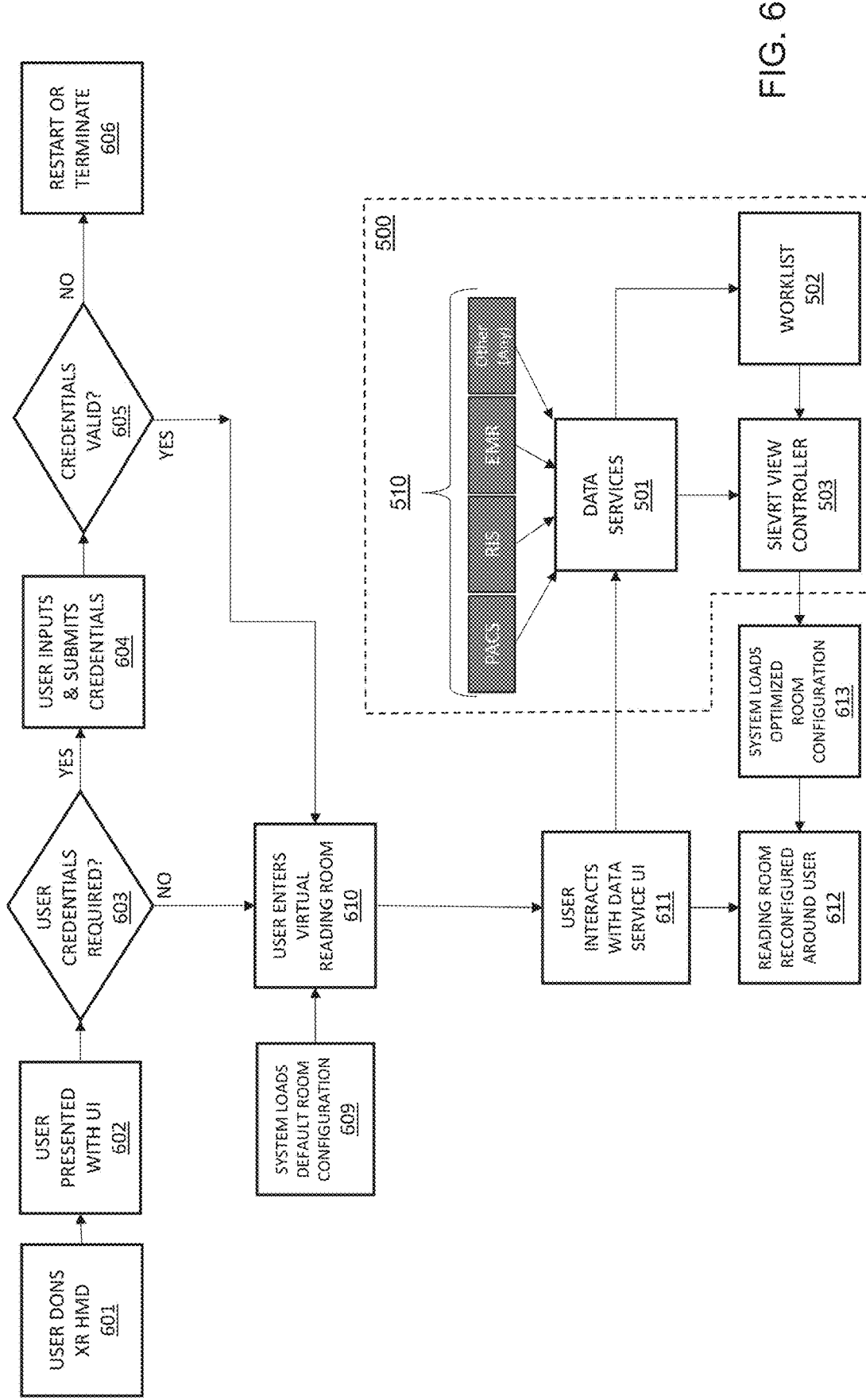
FIG. 6 illustrates an exemplary data flow within the SieVRt virtual radiology reading room environment.

FIG. 6 illustrates an exemplary data flow for a session within the SieVRt virtual radiology reading room environment 500. In step 601, the user puts on the XR HMD and is presented with the user interface (UI) in step 602. In step 603, if user credentials are required, the user will enter the appropriate log-in information in step 604. If the credentials are valid in step 605, the user enters the virtual reading room at step 610. If the credentials are not valid, in step 606, the user will be required to restart, or the session will terminate. If no credentials are required in step 603, the user will enter the virtual reading room in step 610. When the user enters the virtual reading room, the system will load a default room configuration in step 609.

In step 611, the user interacts with the SieVRt data services module 501 UI, which acquires data from sources 510. The reading room is configured around the user in step 612. The Worklist module 502 presents the queue of work to be done to view controller module 503. In step 613, the system loads an optimized room configuration based on the information provided by Worklist module 502 and the reading room may be reconfigured around the user based on the optimized room configuration determined in step 613.

Example 2: Instant Reconfiguration of the Virtual Reading Room and Its Workflows The virtual reading room environment provides a means for instant switching between optimized subspecialty workflows, which is not possible with traditional hardware setups. Unfortunately, limited space and budgets for traditional reading room configurations has historically led to the consolidation of disparate workflow requirements to a common setup.

Traditional reading room environments are typically static with hardware rigidly confined to stationary desks. While some desks have evolved technologically to move linearly in different planes, for example, moving to a standing vertical height or low-level seated height, there are physical barriers to moving around large amounts of equipment weighing, at times, hundreds of kilograms. Customization schemas are therefore highly limited and may not address wider possibilities or address certain handicaps. For example, ergonomically, there is no practical way to interpret medical images while laying down flat on one's back.

The "one-size-fits-all" ideology for radiology monitor configuration and workflow setup is an anathema to the many subspecialized radiologists and divisions around the world. Virtualizing the reading room effectively resolves this dilemma by providing an infinite amount of user configurable workflow schemes, as well as any preferred ergonomic variants, without the need to encroach on limited space or budget.

The inventive SieVRt system includes the ability to dynamically adjust the spatial orientation of virtual monitors, with user input or automatically, allowing the displays to be optimized for the type of information being displayed (i.e., tabular worklist data vs. medical imaging stacks). In another exemplary embodiment, the SieVRt system could automatically determine where to set the virtualized image displays, without user input, for optimal viewing angle. For example, if a user is lying down horizontally, the virtualized image displays would automatically move into the parallel plane to allow for optimized interpretation of medical images. Any number of combinations in any plane is therefore possible.

Two-dimensional display quality is typically expressed in terms of display resolution, luminance, light uniformity, refresh rates, subpixel arrangement and pixel density, however, these metrics alone cannot effectively measure display quality in VR headsets. As such, VR headsets display quality assessment must also take into account key specifications such as FOV (field of view), aspect ratio of displays, and degree-based pixel density, to better ascertain capabilities and limitations of data and image display. As display technologies continue to advance, SieVRt can dynamically adjust its virtual display environment to maximize the available pixel resolution in current and future VR headsets for radiological interpretation and reporting. This is achieved by dynamically expanding and utilizing the virtual configuration and real estate in SieVRt to entirely display medical imaging data during focused interpretation tasks.

Pixel resolution and virtual display size in SieVRt VR space can also be reconfigured, either automatically or by the user, to be better optimized for display calibration which may include among others, grayscale calibration, luminance calibration, color space, etc. In another embodiment, the virtual reality display size and pixel resolution can be reconfigured to be better optimized for non-interpretation tasks such as order verification, patient history assessment and reporting review, which may not require the use of the entire display resolution and necessitate multi-tasking workflows. This dynamic configuration ability is a function that is unique to the inventive system.

Example 3: Radiology Workflows in a Virtualized Environment

The number of monitors, and associated resolution requirements, workflow actions taken by the radiologist, and number of previous studies needing to be reviewed prior to interpretation, tend to be different for different radiology subspecialties. The following provides an illustrative example of one of the more complex workflows in radiology.

A typical mammography setup utilizes high-resolution 5-MegaPixel (5MP) monitors to ensure quality assurance requirements are met. An embodiment of this setup can include anywhere from three to as many as six monitors:

1. One monitor devoted to case worklist/RIS/EMR
2. One monitor devoted to dictation software/reference (e.g., web-browser)
3. Two monitors devoted to current interpretable images (can be split to review priors)
4. Two monitors devoted to prior images for review (optional)

Mammography typically requires the review of multiple prior mammograms dating back several years to compare to the current acquired mammogram. This comparison provides the radiologist with a timeline of images to identify changes and diagnose potentially cancerous lesions. The subtle changes in findings over time are crucial to the screening and diagnosis of potential breast cancers. While comparison studies are reviewed in most subspecialties in radiology, the number of priors needing to be reviewed in mammography is far greater. This requirement has a direct impact on the number of monitors and display real estate required for interpretation.

Mammography also necessitates a more robust use of particular imaging viewer tools such as the pan and zoom function on imaging displays. Mammography high-resolution images are magnified by many factors to see subtle findings such as calcifications, architectural distortions, and border characteristics. Therefore, aside from display real estate, radiologists are executing multiple actions on the images prior to interpretation. These actions inherently decrease reporting efficiency as the number of mouse-clicks needed to navigate to, select, and utilize imaging tools, though variable on vendor design, add to the complexity of image interpretation. Furthermore, ambient light and the proper luminance of monitors influence image interpretation. These are highly variable in healthcare settings and may, at times, be difficult to control. For example, hallway lights, office lighting, and windows can all effect image interpretation.

Virtualizing mammography workflow within the SieVRt system will allow for any number of configurable instances of image display for interpretation. Configurability may be achieved through algorithmically adjusted resolution maximums based upon viewing the DICOM object of interest. In one embodiment, the system is configured with the ability to fill the entire VR space field of view (FOV) with the DICOM object of interest.

In another embodiment, the use of gestures such as a movement of the head in a particular gesture, such as a head nod, or combination of a head nod and controller button press, or a unique hand movement with or without a controller button press, can result in the unlocking and locking onto a DICOM object in VR space.

In still another embodiment, hand gestures such as "pinch and zoom", may be implemented on DICOM objects in the VR space utilizing eye-tracking, hand gestures, voice commands, controller button presses and/or a combination of any of these.

In some embodiments, the use of voice commands in VR space will result in certain DICOM function states to change. An illustrative example includes the use of executive commands to change DICOM Grayscale functions such as window/level presets. Another illustrative example includes the use of voice commands to control worklist functions in VR space such as launching a case through an invocation phrase.

In some embodiments, the inventive system may employ eye-tracking algorithms to distinguish executive commands from normal dictation phrases. An illustrative example is the use of eye-tracking to determine whether the user is viewing a DICOM object, and when an executive command is invoked, only applying the executive command to the DICOM object as opposed to dictating the phrase. For example:

1. User initiates an executive command for "bone window" while looking at a DICOM object: the DICOM window/level preset changes to bone window.
2. User initiates an executive command for "bone window" while looking at Dictation window: The phrase "bone window" is entered into the dictation window.

In conventional radiology, the limitation with physical devices leads to configuring monitors in a certain standard parallel and typically vertically oriented pattern, whereas the contemplated design in VR will allow radiologists to configure images in any manner the radiologist chooses—without physical constraints. This feature is only achievable in the VR space.

By employing proprietary algorithms, the ambient lighting and luminance can be automated and controlled within the VR space per technical standards for radiology.

In some embodiments, software is provided to automate internal TG18 pattern testing for quality assurance and radiology interpretation in a VR space.

In other embodiments, proprietary algorithms are employed to optimize diagnostic radiology tools in the VR setting such as mammography specific 4 Quadrant Zoom Function, CAD, Spot Magnification. These tools can be modified to work specifically in the VR space utilizing unique methods of focused FOV and utilizing eye-tracking to automate tools to the area of the user's gaze.

Example 4: 3D/4D Volumetric Imaging in SieVRt

Traditional medical imaging monitor displays display images and data in two dimensions. While the underlying technologies utilized in VR headsets are the same, thanks to the combination of optical magnification lenses, high resolution displays, and rich data transmission protocols, VR headsets can display and render stereoscopic data in a way that provides more immersive experiences by introducing depth perception and the ability to appreciate data in three dimensions. Using the inventive SieVRt system, the user can interact with 3D reconstructions of medical imaging stack as described in earlier sections.

Figure 4:
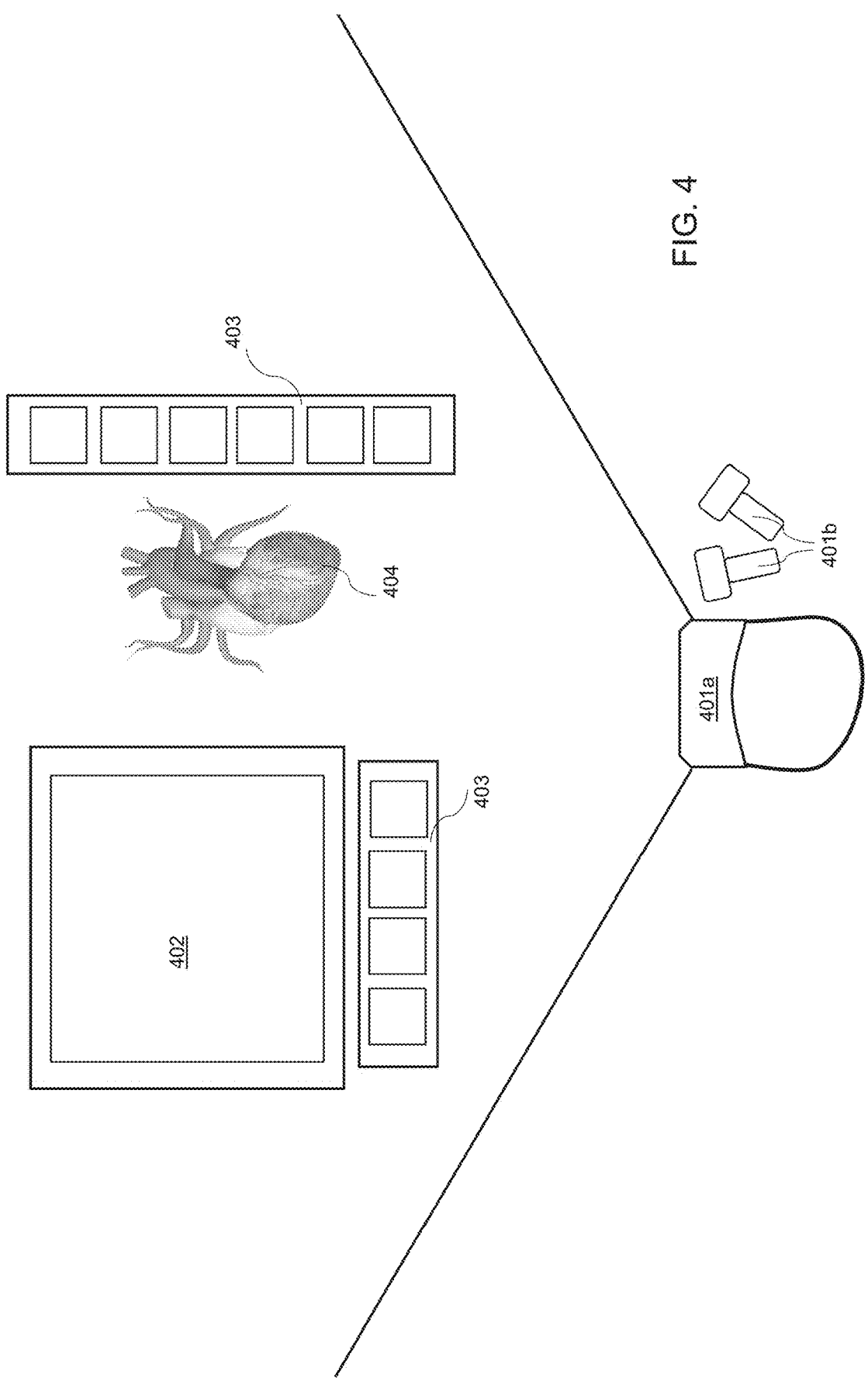
FIG. 4 is a diagram showing an example of reconfiguration within the inventive system for subspecialty workflows.

FIG. 4 diagrammatically illustrates an example of an embodiment of the inventive approach for implementing a workflow for 3D volumetric interaction. A SieVRt user with an XR HMD 401a and associated input devices 401b can experience and interact with the virtual reading room environment using any combination of their five of their senses. A virtual monitor 402 is used to display relevant 2D medical imaging data. A configurable UI 403 allows the user to interact with a variety of tools for 2D, 3D, and 4D image manipulation and data handling, allowing seamless switching to subspecialty workflows such as 3D volumetric imaging. A 3D/4D volumetric reconstruction 404, in this example, a heart and major arteries, may also be displayed within the virtual reading room environment. The user is able to experience and interact with this volume using any combination of five of their senses and can manipulate the volumetric reconstruction using the tools that are available in the UI 403.

A user that is inside the inventive SieVRt virtual environment can use a user interface (UI) to retrieve "stacks" of volumetric DICOM image data (CT, MRI, Ultrasound, Nuclear Medicine) from either a PACS server or from a local computer file system.

Assuming a hospital uses a DICOM server that includes worklist functionalities, the SieVRt system can explicitly obtain worklist information from the software. In the absence of a worklist on the DICOM service, SieVRt would be able to create a worklist by either (a) assembling the worklist by grabbing the needed DICOM tag information on PACS, or (b) querying the RIS directly or through its associated software.

Figure 8A:
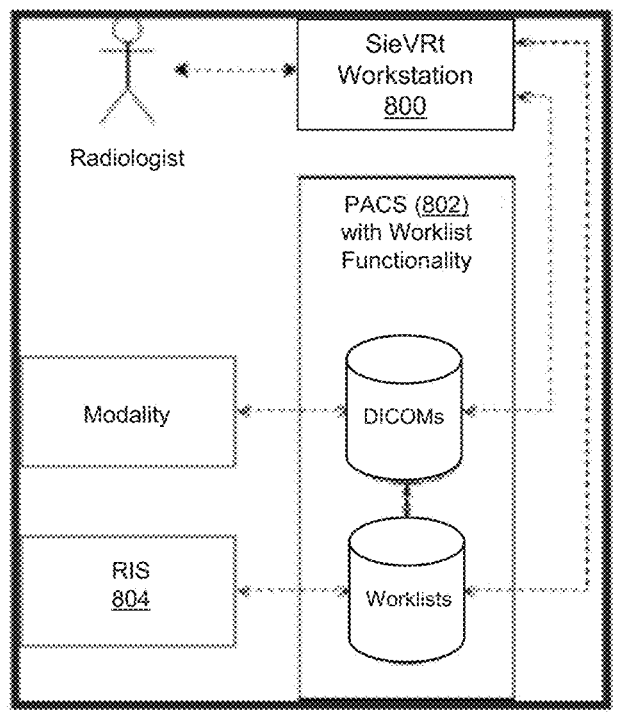
FIGS. 8A-8C provide high level diagrams of exemplary information flow between SieVRt and PACS/RIS.
Figure 8B:
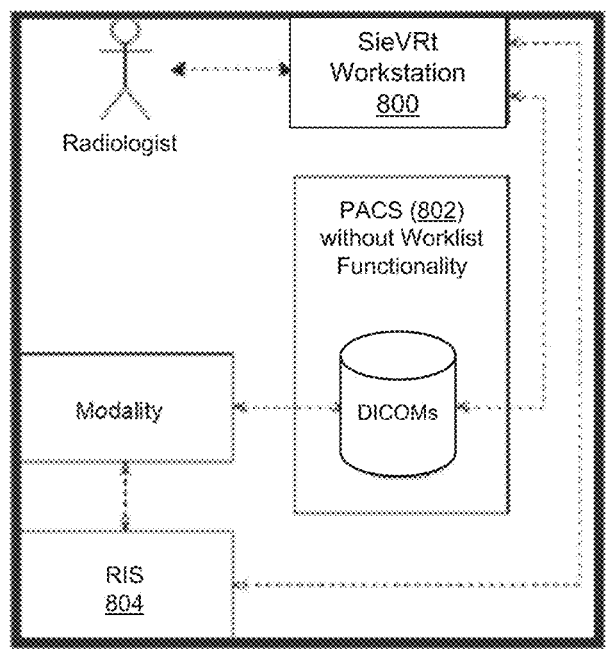
Figure 8C:
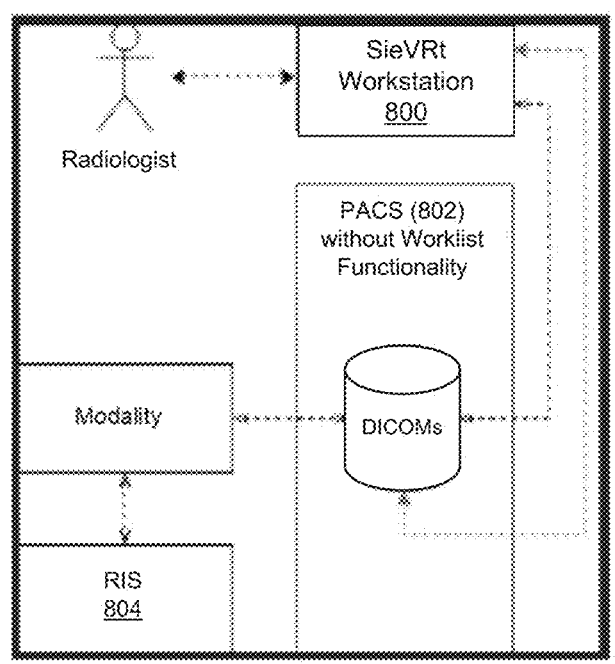

FIGS. 8A-8C provide exemplary high-level diagrams of information flow between SieVRt 800 and PACS/RIS. FIG. 8A represents the flow of information if there are worklists built into the PACS system 802. FIG. 8B illustrates the information flow if SieVRt 800 queries information on worklists through a RIS 804. FIG. 8C shows that in the absence of access to a RIS system 804, SieVRt 800 will assemble worklists through DICOM study information stored in the PACS 802.

One or more stacks can then be displayed on one or more simulated 2D monitors within the virtual environment. In an exemplary implementation, up to six stacks of data can be displayed on a single simulated 2D monitor and there are three monitors within the virtual environment. The number of monitors is provided as an example only. It will be readily apparent to those of skill in the art that the inventive system provides the user the ability to increase or decrease the number of stacks and simulated monitors as needed.

Once a DICOM stack is displayed on a simulated 2D monitor, it can be scrolled through, and interacted with, using a hardware based wireless controller, hand gestures without a controller (e.g., gyro-based sensors in a glove or other wearable), voice commands, or eye tracking techniques, or some combination of these methods.

Figure 9A:
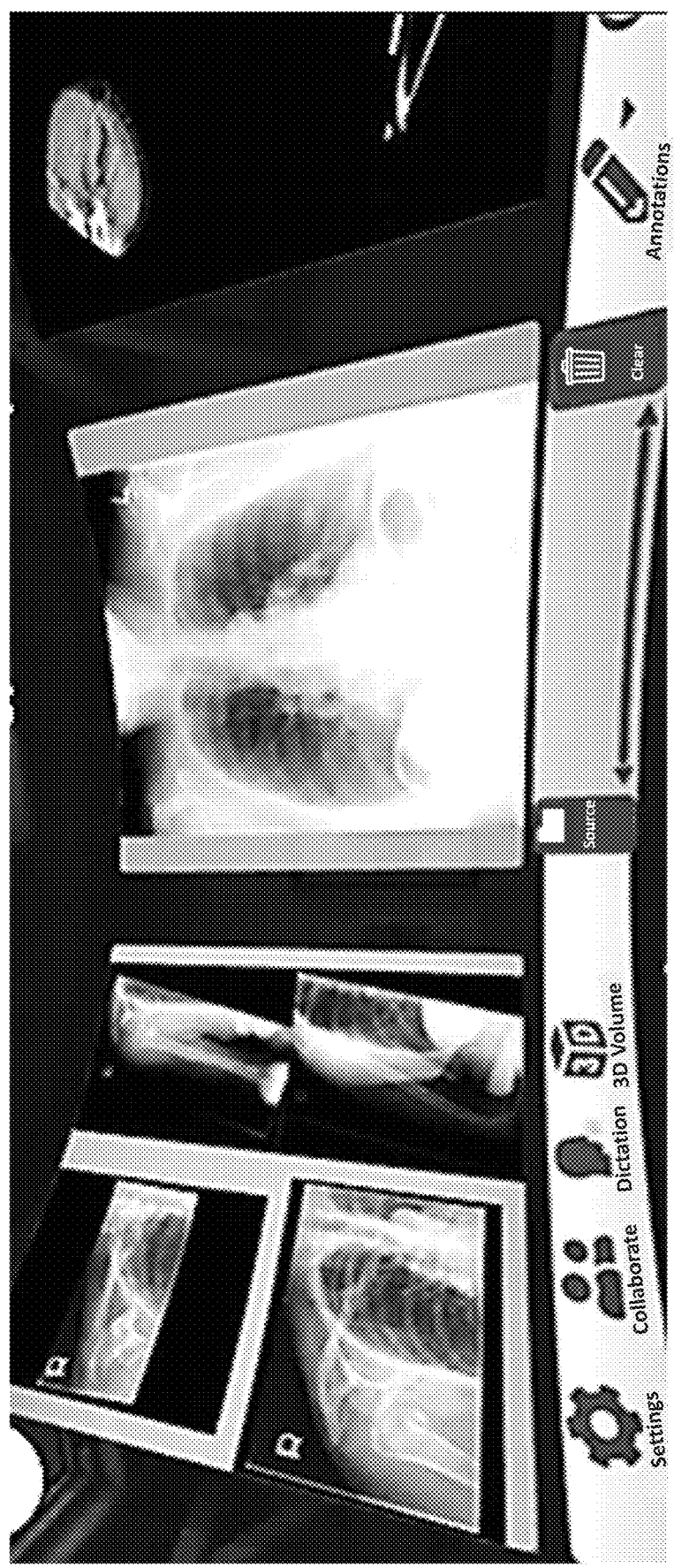
FIG. 9A is a photograph of an example of displays on 2D monitors.

If the original DICOM stack is in the axial anatomic orientation, images in the sagittal, and coronal, or arbitrary anatomic plans (obliques) can be reconstructed using the planar reconstruction tool. This tool creates additional stacks of images that populate other simulated 2D monitors. FIG. 9A is a photograph showing an example of displays on a group of 2D monitors.

Within the same workflow, a user can seamlessly convert a stack of volumetric DICOM image data into an interactable 3D object using volume rendering. The user first selects the 3D Conversion tool from the virtual UI. Once the 3D tool is selected, the user can select a stack of volumetric DICOM image data from one of the simulated 2D displays. This prompts the system to run the volume rendering algorithms and creates a new 3D volume object within the virtual environment. In a preferred embodiment, the original stack data will not be manipulated to ensure that the original data is preserved. Instead, a copy of the data will be created with the volume rendering algorithms run on the data copy. Alternatively, the active 3D object can be constructed from the original stack to constrain resources.

Once the 3D volume is constructed within the virtual environment it can be interacted with using one or more of a hardware-based wireless controllers, hand gestures without a controller, voice commands, eye tracking techniques, or some combination of these methods. Using these techniques, the 3D volume object can be translated and rotated along any arbitrary axis within the virtual environment. The size of the object can also be increased or decreased using UI elements.

Figure 9B:
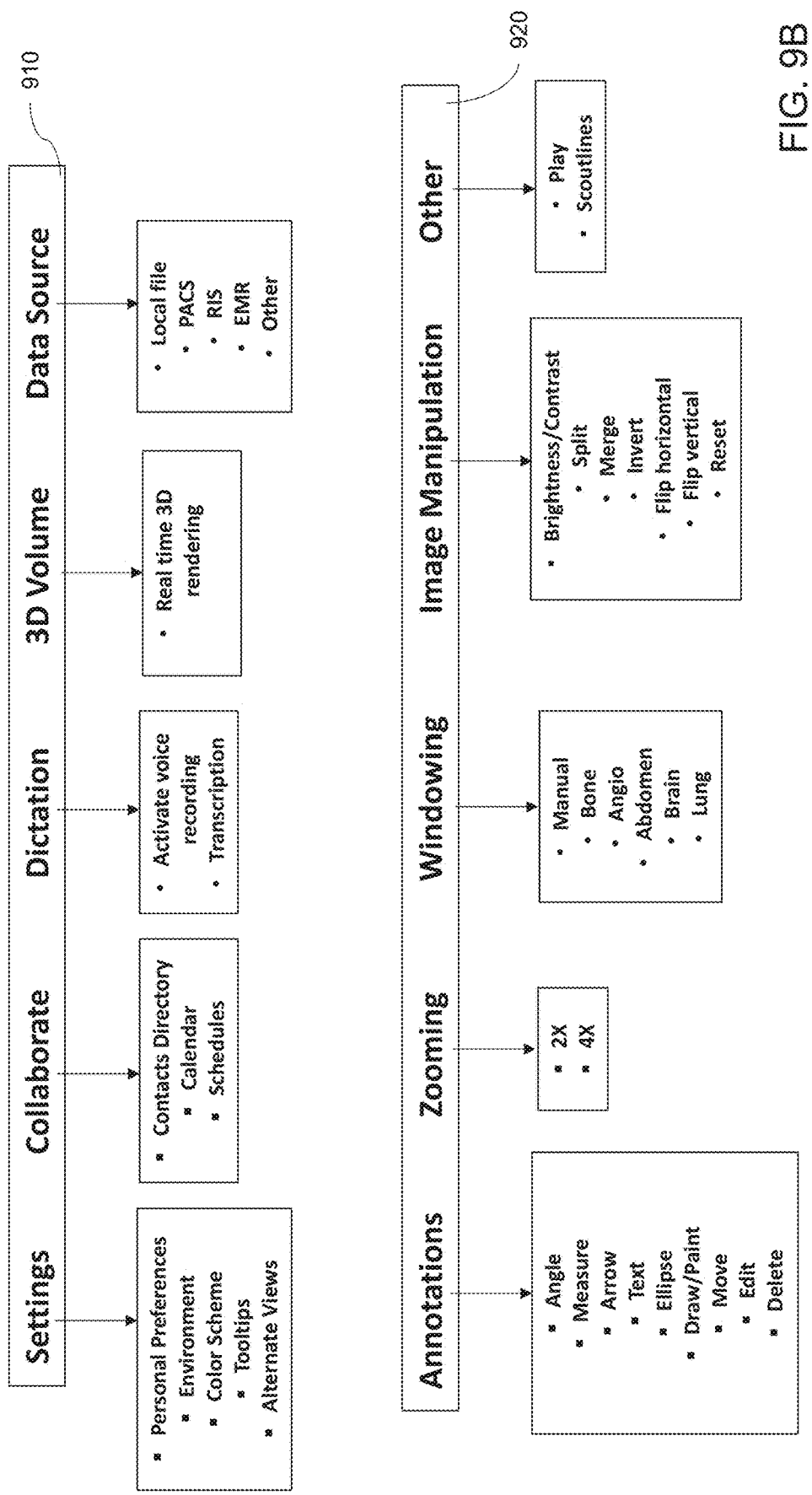
FIG. 9B shows exemplary tool menus that may be displayed in the SieVRt UI.

FIG. 9B displays an exemplary tool menu that may be displayed in the SieVRt UI. The tabs in menu 910 provide the set-up for initiating a collaboration and setting parameters for the session. Under the "Settings" tab, the user can select their personal preferences for viewing and general operation such as brightness, color scheme, tool tips, etc. The "Collaborate" tab can be used to initiate a collaboration, for example, by selecting one or more collaborators that the host wishes to invite to join the session via a voice message, text message or other communication. This tab may also include calendars with invitations and links to start a session. The "Dictation" tab allows the host to record their verbal comments and may enable recording of the collaborators comments as well. This tab may also be used to initiate transcription of the spoken comments. The 3D volume tab is selected to initiate volume rendering algorithms to create a 3D interactive object as described above. The "Data Source" tab allows the host to select the sources of the data to be displayed, manipulated and/or discussed during the session.

Menu 920 provides sample tabs that can be used in conjunction with images that are displayed during a session, for example once the 3D object has been rendered. Image parameters of the 3D object can be adjusted in real time within the virtual environment using a variety of image processing techniques accessible through the UI. Threshold, brightness, contrast, window/level, and transparency can be adjusted and a look up table or color map can also be applied to the data. Using these methods, features such as underlying structures—veins, arteries, organs, etc.—can be rendered for view.

If two stacks of data are being shown in a single 2D simulated display, and the user selects them for 3D volume rendering, two independent 3D volume objects will be rendered and co-registered. Image parameters such as threshold, brightness, contrast, window/level, transparency and color map of these 3D objects can be independently changed. The position, translation, rotation and size of the co-registered objects are linked and change in tandem. This feature allows for the user to view and interact with 3D volumetric multimodal imaging data, such as Positron Emission Tomography/Computed Tomography data within the virtual environment. This feature could be used for diagnostics, monitoring of disease progression, and/or presurgical planning.

The user can also remove data along three Cartesian planes centered on the object. When the cutting tool is initiated, a cube with transparent faces and opaque edges appears around the object. A grab point is located at the center of each face of the cube. This grab point is indicated by a smaller opaque cube. When a grab point is engaged by the user, it allows the user to translate the cube surface along one Cartesian plane. The surface of the cube acts as a "cutting plane", giving the appearance that data has been removed from 3D Object. The surface can then be translated back to its original position, causing the image data to reappear. The opaque edges of the cube can also serve as grab points for rotation of the 3D Object.

A freehand eraser tool can also be used to remove data from the 3D object. The user can select the eraser tool, which then creates a sphere that the user can virtually grab and bring into contact with the 3D object. Where the sphere intersects with the 3D object it will give the appearance that data is being removed from the object. The size of the sphere can be changed using a UI element, allowing the user to erase larger or smaller areas of the 3D object. An undo option within the UI can also allow the user to undo the previous removal of data from the 3D object.

The split/merge object tool can be used to divide a 3D object into separate objects that can be manipulated independently. These objects can then be reattached to each other to form a single 3D object with a different configuration. When a user selects the split/merge tool a virtual cutting plane object is created near the 3D object. The user can then manipulate the size, position and rotation of the cutting plane. Once the cutting plane object is in place, the user can then interact with the UI to split the 3D object along the cutting plane, creating two independent 3D objects. The user can then change to position and orientation of those objects in relation to each other. This process can be repeated by the user and arbitrary number of times. The user can the select the merge option from the UI to re-form a single 3D object. This tool could be used in surgical education or presurgical planning.

The freehand paint surface annotation tool will allow the user to overlay color data onto of a 3D object. The user can select the paint surface tool, which then creates a virtual paint object which is used to paint onto the 3D surface. Using a UI element, the user can select a color from a color pallet and then paint an overlay layer onto the 3D object or portions of the object. This paint data can be used to highlight regions of interest on the 3D object and can be saved as an annotation associated with either the parent DICOM or the 3D object.

An arrow annotation can also be selected and "attached" to the 3D object. When the user selects the 3D arrow annotation tool, a virtual arrow object will be generated in the SieVRt environment. The user can change the placement of the arrow in the virtual environment using one of the various interaction methods mentioned previously. The color, size, position and rotation of the arrow can be adjusted by the user and the arrow can then be fixed in position with respect to the 3D object. After the arrow is fixed, it will move in tandem with the object, and its parameters can be saved as an annotation associated with either the parent DICOM or the 3D object.

In a similar manner, a text annotation can be attached to the 3D object. When the user selects the 3D text annotation tool, a virtual keyboard will appear. The user can interact with that keyboard to create a text object consisting of a combination of letter(s)/number(s). A voice dictation system or eye tracking interaction system could also be used as an input system for the virtual keyboard. Once the text object has been created, its color, size, position and rotation can be changed by the user. The text annotation can then be fixed in position with respect to the 3D object and saved as an annotation associated with either the parent DICOM or the 3D object.

In combination, the annotation and eraser tools could be used for the efficient creation of annotated imaging datasets for machine learning applications. Currently, the segmentation of a stack of DICOM data using traditional DICOM annotation tools is tedious and often done slice by slice by physicians. SieVRt will allow physicians to segment data and draw regions of interest in 3D on volumetric data that has already been reconstructed, thereby speeding up the annotation of the data.

As will be recognized by those of skill in the art, the menu items and tools shown in FIGS. 9A and 9B are not intended to be limiting, but are provided to illustrate a few examples of possible features and functions that may be useful within a medical imaging system such as that disclosed herein.

Example 5: Volumetric Measurement of 3D/4D Imaging Data in SieVRt

Within a medical image, there may be regions of interest (ROIs) that need to be identified, outlined, and properly labelled in order to create a segmented and annotated dataset. Traditionally, this is done by a trained user and can be a tedious process. The user needs to visually examine the digital image and then draw a digital outline around the ROI. The pixel data from the outlined ROI can then be stored as a separate data file. ROIs can also be labelled to provide other users with context. This data can be used to calculate a variety of geometric quantities associated with the ROI. For example, the area, circumference, diameter, and average pixel grey scale values may be calculated. Multiple ROIs can be generated and labelled from a single image.

Under current approaches, to create volumetric ROIs, the user processes each 2D image from a stack of medical images that were generated by a volumetric imaging technique (CT/MRI/NM/US, etc.). These ROIs are combined to form a segmented volume. For example, in an abdominal CT scan, an ROI can be drawn around the left kidney in each slice of the scan. When combined in the proper order the data contained within these ROIs would form a representative 3D voxel dataset of the left kidney. This can be an extremely time-consuming process, especially if a fully segmented volumetric dataset is to be generated from whole body medical images.

SieVRt provides the user with a methodology for the creating segmented and labelled volumetric ROIs that is not possible with traditional medical imaging systems.

As in the prior example, a volumetric medical imaging dataset can be displayed as a 3D volumetric object within SieVRt UI. The digital image manipulation and annotation tools of menu 920 can be used to paint directly onto 3D surfaces within the 3D volumetric object to define a voxel-based ROI. This allows the user to directly skip several of the steps traditionally associated with the creation of 3D ROI data. This process and the data that it generates can then be used to create a volumetric training database for machine learning (ML) algorithms. Once an ML algorithm has been trained to create voxel-based ROIs, it could be used to further automate and increase the speed of the process for future voxel ROI generation.

The ML algorithm can be used to generate a preliminary voxel ROI within SieVRt. If needed the user can manually improve this ML generated voxel ROI data using SieVRt's built in tools. This process may be repeated until the results are deemed to be satisfactory.

Example 6: Collaboration in a Virtualized Environment

Figure 3:
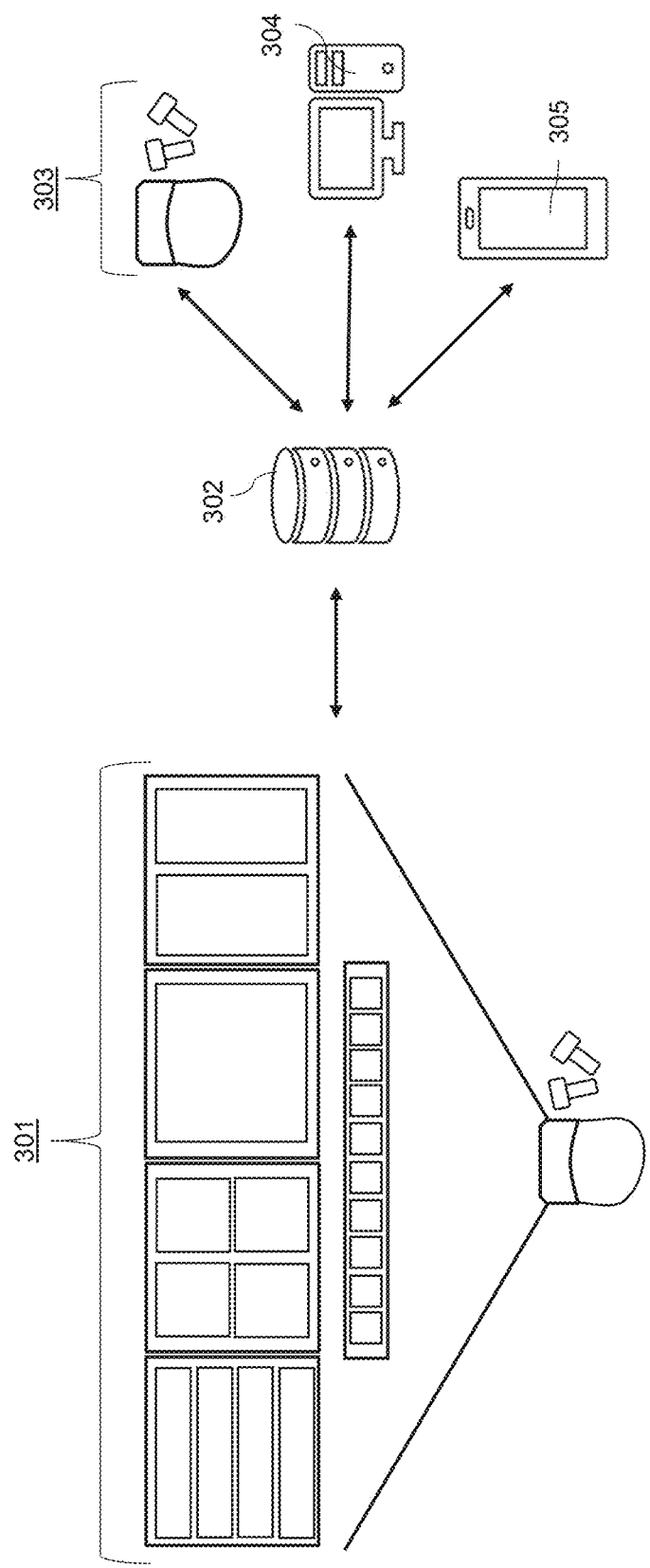
FIG. 3 illustrates a virtual collaborative environment according to an embodiment of the inventive system.

Users within the virtual radiology reading room environment are able to collaborate with other users as illustrated in the example configuration in FIG. 3. A user (host) can initiate a collaboration session from within SieVRt 301. Once a collaboration session in initiated, data is passed from SieVRt to a collaboration server 302. This server can be part of a local area network (LAN), or a wide area network (WAN). Other SieVRt users (clients) 303 can join the collaboration session through their XR HMD and experience a shared interactive virtual environment. Other SieVRt users may also join the collaboration session using a traditional computer 304, e.g., a workstation, desktop, or laptop, or mobile device 305, however, these users will not experience full immersion within the virtual reading room environment. Peer-to-peer connections may also be employed for collaboration sessions as will be described in later examples.

Figure 7A:
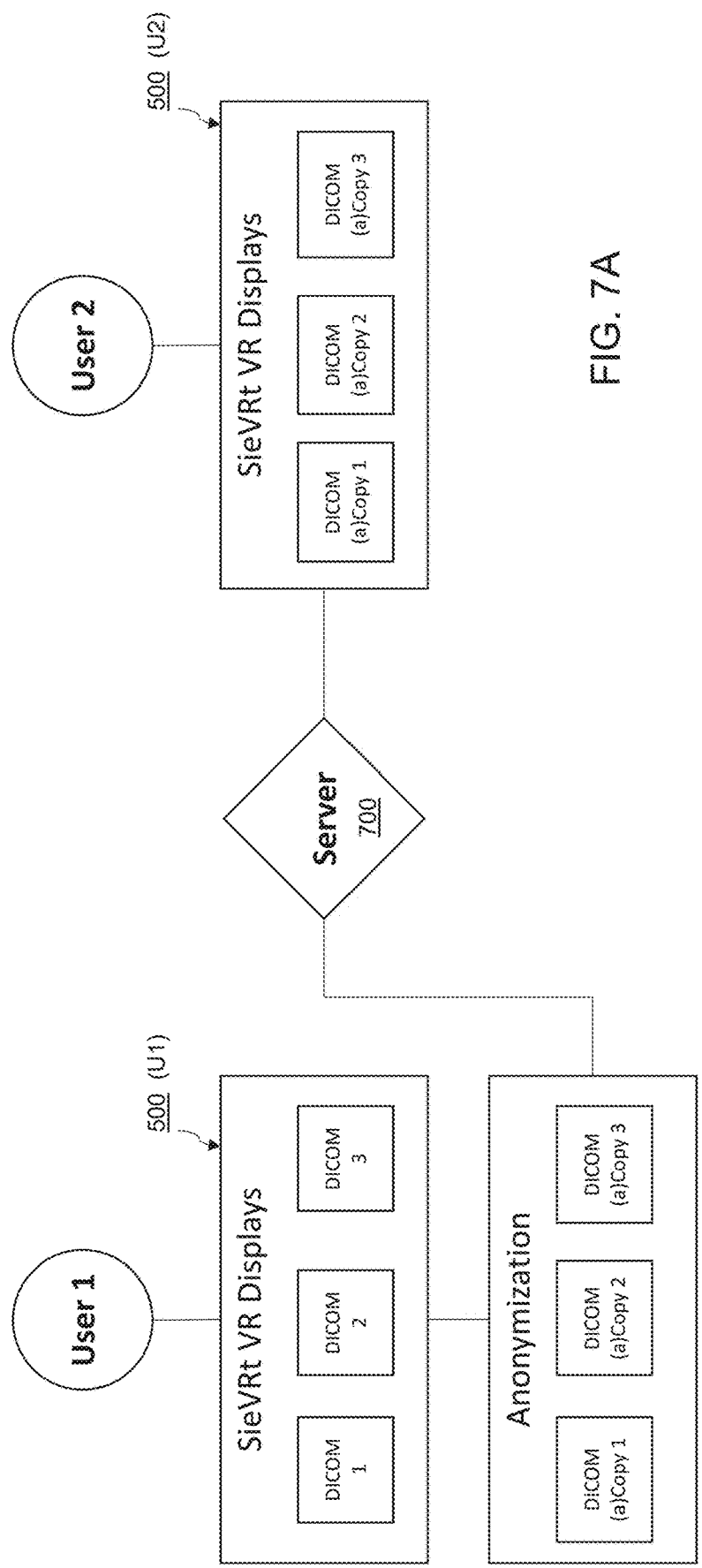
FIGS. 7A-7D illustrate different collaboration example scenarios within the SieVRt system involving single collaborators (FIGS. 7A and 7C) and multiple collaborators (FIGS. 7B and 7D) employing a dedicated server and peer-to-peer communications, respectively.

FIG. 7A provides a high-level diagram of a collaboration example involving a host (User 1) and a single participant (User 2). User 1 initiates a request for a collaboration session with User 2 from a Collaboration User Interface included in the SieVRt graphical user interface 301. User 2 accepts the invitation, initiating the process for loading or copying the DICOM data, e.g., DICOM 1, 2 and 3, which has already been loaded onto User 1's SieVRt VR displays. The DICOM data is optionally anonymized to remove patient information (indicated in the figures as "(a)Copy #") then is sent via the collaboration server 700 to User 2's SieVRt VR displays. Collaboration server 700 will employ appropriate firewalls, log-in and other authentication measures to ensure security of the data and communications as required. FIG. 7C illustrates an alternative implementation of this collaboration employs a peer-to-peer connection 702 in lieu of a dedicated server. As will be recognized by those in the art, additional security, e.g., authentication or credentials, and/or encryption may be employed in the peer-to-peer implementation to safeguard privacy and integrity of the communications. This scenario illustrates a potential professional collaboration operation in which, for example, if a diagnostic report is not sufficient for the referring physician (User 1) to be able to design a care plan for an individual patient, collaboration or consultation with a radiologist or sub-specialist (User 2) may be required for clarification. The data can be immediately shared in the appropriate context using the inventive SieVRt environment.

Figure 7B:
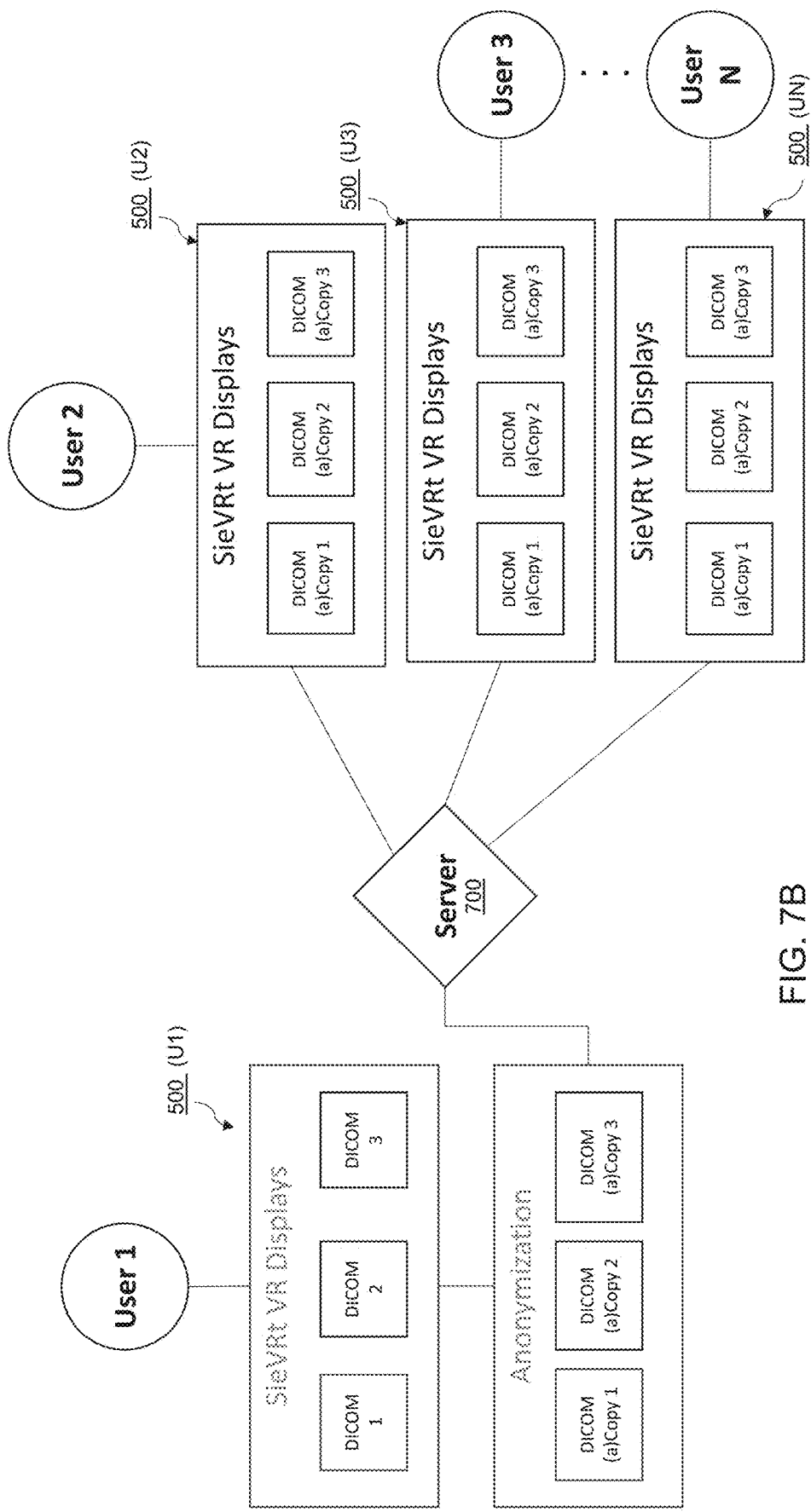
Figure 7C:
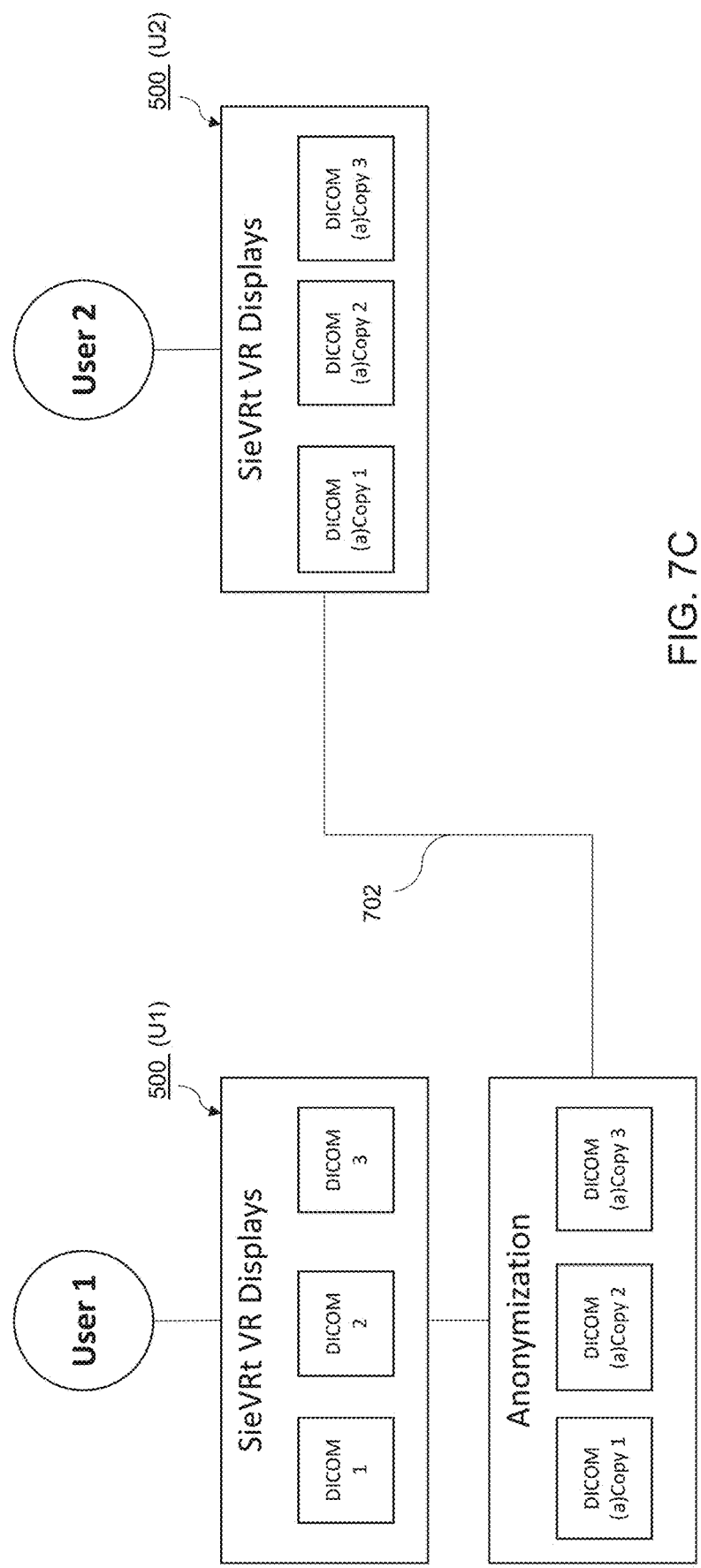
Figure 7D:
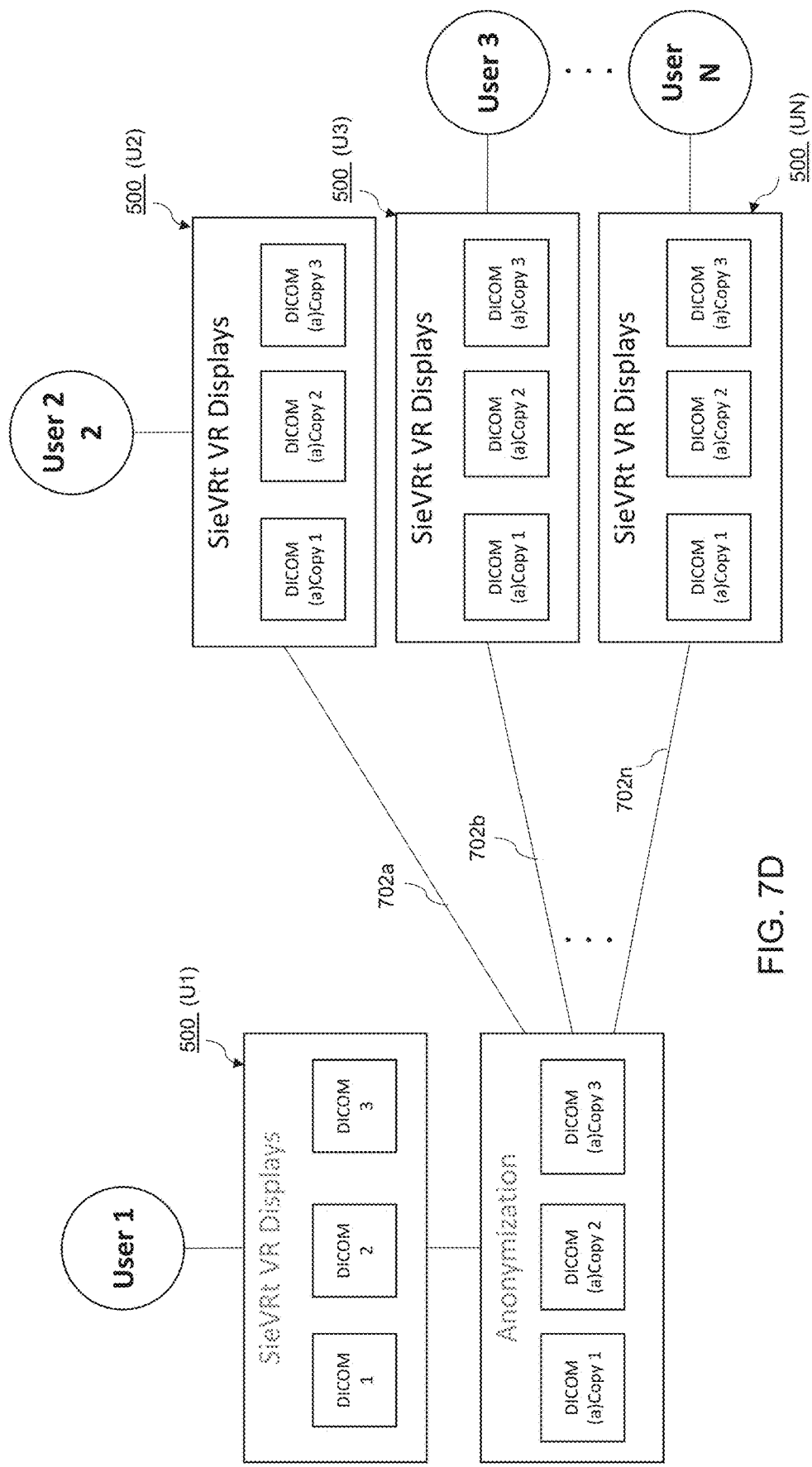

FIG. 7B illustrates a collaboration example involving a host (User 1) and up to N users (User 2, User 3, . . . , User N). User 1 initiates a request for a collaboration session with each of Users 2-N from a Collaboration User Interface included in the SieVRt graphical user interface 301. Each of the N users, and their respective SieVRt interfaces, may be located at different geographical locations, around the country or around the world. Users 2-N accept the invitation, initiating the process for copying the DICOM data, e.g., DICOM 1, 2 and 3, which has already been loaded onto User 1's SieVRt VR displays. The DICOM data is optionally anonymized to remove patient information, when required then is sent via the collaboration server to User 2-N's SieVRt VR displays. FIG. 7D illustrates an alternative implementation of the multi-user collaboration employs peer-to-peer connections 702a, 702b, . . . 702n in lieu of a dedicated server.

The multi-user collaboration scenario illustrates a potential teaching session in which, for example, User 1 is a senior physician or radiologist in a teaching hospital and Users 2-N are medical students, interns or residents. User 1 can initiate the request for a collaboration as part of a regularly scheduled seminar or laboratory exercise or may send a special request in situations where a particularly interesting case comes up unexpectedly and presents a teaching opportunity through substantially real-time participation by Users 2-N in a discussion of the case. Other scenarios in which the multi-user collaboration capability of SieVRt would be useful include the ability to simultaneously consult with multiple experts who may be located at different medical facilities. The same data can be immediately shared at all locations, allowing near real time collaboration (subject primarily to speed capacity of the individual communications links). Significant advantages in this scenario include being able to institute a productive discussion on relatively short notice within a shared immersive environment and without significant cost to the participants in terms of time and travel. Each participant has everything needed for the collaboration in the SieVRt virtual radiology reading room environment 500.

There are many scenarios in which collaboration should occur in medical imaging that can be addressed and enhanced in a virtualized environment. These scenarios address several critical phases of the overall workflow, examples of which are:

a. Protocol and image quality review
b. Professional collaboration and communication
c. Communication of the results to a patient A number of institutions that have implemented one or more of these procedures to address quality control, teleradiology and patient engagement, however, these workflows are frequently ad hoc and implemented within the constraints of existing clinical or diagnostic infrastructure and lack targeted optimization for the desired process. In many cases, they are implemented through a phone call with ad hoc shared images or merely through verbal descriptions.

Example 7: Protocol and Image Quality Review (Order Creation)

When a physician determines that a patient needs an imaging study to be performed, an order is entered into the CPOE (computer physician order entry) system, or equivalent, at a local, or remote imaging center. There are many options for this order—modality, body part, field of view, etc. that are frequently encoded according to established imaging protocols. When a protocol is ordered, it may require clarification from either the radiologist (or sub-specialist) that will review the results, or the technician regarding specifics of the purpose and objective of the image capture. This collaboration may alter parameters in the order and may even change the modality based on specialty expertise on the selection of appropriate imaging and parameters. SieVRt enables this collaboration through an alert mechanism targeted to the appropriate resource based on the query. In some embodiments, the alert mechanism can be incorporated into or associated with Worklist component 502, where the alert can be implemented via a sub-loop within the queue of work processes to be performed. Intervention in adjusting parameters that are automatically set in a protocol template is required for customized patient care. There may be dependencies on parameters in the care plan, or modality specification, or even affect the prioritization of a procedure. These must all manifest in some alert to the attending resource (physician, nurse, technician, etc.), with the worklist one of the options. Through shared visualization, the correct order can be verified, eliminating downstream inefficiency and unnecessary resource utilization due to the performance of sub-optimal or even unnecessary imaging procedures.

Using a similar scenario to the "Order Creation" process described above, when an order is created and verified, the patient is scheduled to go to an imaging department or center. Within the imaging facility, a technician performs the ordered process and captures the desired image. Occasionally, there needs to be clarification of the order so that the technician can perform the procedure. In addition, imaging parameters and capture can be quite complicated in some protocols, and the correct capture of the desired image is non-trivial. In these cases, it is highly desirable to request a review of the captured image by a professional (radiologist or sub-specialist) to ensure that the image meets the needs of the protocol. SieVRt provides this capability through the underlying alert mechanism and ability to directly share the captured image information and context, wherein an appropriate imaging expert can review the image for correctness and quality. This process avoids the wasted time and expense of having to recall a patient to recapture an image that was not correctly processed.

Example 8: Professional Collaboration and Communication

Medical imaging specialists, in radiology and/or nuclear medicine, may consult with each other about patient case data. Collaboration in this scenario can be facilitated by the physical relocation of a physician or multiple physicians to another physician's office in which they can simultaneously observe the patient data on the office's medical imaging workstation. This type of collaboration over patient data can also occur through a telephone phone call. In this scenario, one or more physicians enter into a telephone call and they independently access the same patient's medical imaging data on their medical imaging workstations. They each observe the patient data on their own independent medical imaging workstations and discuss the patient case using the telephone as a means of information exchange. This type of information exchange can also be facilitated through the use of web or video conferencing tools.

Multidisciplinary collaboration occurs when the medical imaging specialist works as part of a patient care team. Often specialists from other medical fields, like critical care or surgery, will consult with a medical imaging specialist to gain a better understanding of medical imaging patient data. This type of multidisciplinary approach to patient care has been shown to limit adverse events, improve healthcare outcomes, decrease the length of patient stay, and a improve patient satisfaction with staff. Multidisciplinary collaboration in this scenario can be facilitated by the physical relocation of a physician or multiple physicians to the medical imaging specialist's office in which they can simultaneously observe the patient data on the office's medical imaging workstation. This type of collaboration can also occur through a telephone phone call. In this scenario, a medical imaging specialist typically receives a telephone call from one of their non-medical imaging colleagues. The attending physician will ask the medical imaging specialist to access a particular patient case and provide an assessment of the data over the phone. In this scenario, the attending physician may or may not have local access to the patient's medical imaging data This type of information exchange can also be facilitated through the use of web or video conferencing tools.

For use in resident education, during training, medical imaging residents will often be mentored by senior medical imaging specialists. Typically, one or more medical residents will sit with a senior medical imaging specialist in their office. The two physicians will go through patient case data together on the office's medical imaging workstation. Either the senior physician will work through patient case data with the resident observing and asking questions, or the resident will go through patient case data with the senior physician providing guidance and critique. Collaboration using the inventive system provides greater flexibility in training regardless of whether the participants are in a single location or at different locations.

For use in grand rounds, patient case data are presented to an audience of physicians, residents and/or medical students. This audience typically meets in an auditorium and novel case findings are presented to the audience.

With SieVRt, two or more medical imaging specialists can similarly collaborate without needing to be in the same physical location. Each physician would wear a virtual reality head mounted display (HMD). SieVRt software could be installed on each of the HMDs, if they were of the standalone variety, or on the individual physician workstations, if they were using tethered HMD, or on a server to facilitate collaboration. Referring to FIG. 3, a collaboration session would be initiated using the SieVRt graphical user interface. SieVRt can be used to display medical imaging data within its virtual reading room environment. Visual, text, auditory and ancillary, e.g., support data (participant position and interaction input data in virtual space, etc.) can be distributed among the physicians allowing them to speak and interact with each other and with the patient data within the virtual environment. Each physician could have a representative digital avatar within SieVRt that they would use as a visual anchor in the virtual space so as to improve the immersive collaborative experience for all participants. Analytical information from each session could be captured and recorded to facilitate learning or measurement of individual physician performance. To further expand on the session capture feature, in many embodiments, the SieVRt system includes the ability to generate and store a record of each collaboration session. In general, the record includes information about all data reviewed during each session. For example, if participants confer about a collection of patient data, e.g., MRI, X-rays, CT, etc. the system may, if required, record the raw data, any 2D/3D/4D models constructed from that data and displayed during the collaboration session, labels and annotation of the images and/or data, comments and discussion, and any other information exchanged during the session. The records may be associated with an assigned session identifier, allowing one or more participant to revisit information exchanged during the collaborations. In some embodiments, this record may be associated with the patient's medical records.

The ability to present any data—imaging and/or associated clinical information—in the optimal format independent of local hardware constraints (e.g., physical monitors) is a core functionality of the invention. By virtualizing the optimized environment, it can be rendered at any location, and shared with collaborators in a way that is optimal for the desired outcome. For example, a sub-specialist may utilize a more complex information environment to perform a diagnosis than might be required for a collaboration session with a referring physician. Both environments can be simultaneously supported for the duration of the collaboration, thereby not imposing a sub-optimal data environment on either of the collaborators. One-on-one, multidisciplinary, resident education and grand rounds type experiences could all be facilitated through SieVRt. This capability is unique in the healthcare environment.

Example 9: Communication to Patient

This scenario is fundamental to the long-term objective of engaging patients in their own care plan. In this scenario, some or all of the diagnosis and supporting information can be shared in context with the patient interacting with the physician, or other healthcare professional. The shared virtual environment could include educational information and aids, such as video, to explain the medical condition(s) to a patient and ensure that there is a clear understanding of the diagnosis, and the responsibilities of the patient in the execution of the care plan.

Because the system is hosted on virtual hardware (cloud architect), there is no concern about system hardware obsolescence. This allows the sharing of data and images with healthcare professionals at nearly every level of technical sophistication and resource availability.

The invention claimed is:

1. A medical imaging system for executing workflow, the system comprising:
   a data services module configured to receive medical data from one or more data source;
   a worklist module in communication with the data services module and configured for presenting at least one queue of work to be performed within the workflow;
   a view controller module in communication with the data services module and the worklist module, the view controller module configured to receive the workflow and the medical data and apply one or more protocol for processing the medical data based on the worklist, the view controller module configured to execute one or more of a component for processing the medical data, a component for rendering multi-dimensional models of the medical data, a component for interpretation of medical data, and generate an output comprising a display configuration; and
   one or more virtual reality (VR) imaging devices in communication with the view controller module and configured for receiving the display configuration and generating a virtual display of one of more of 1D, 2D, 3D and 4D representations of the medical data, wherein the virtual display is manipulatable by a user through a user interface associated with the one or more virtual reality imaging devices;
   wherein the one or more protocol is stored within a protocol component within the view controller module, and wherein the view controller module is further configured to track new configurations corresponding to manipulations of the virtual display by the user and add the new configurations to the protocol component, and wherein the new configurations are generated by a learning machine component.

2. The medical imaging system of claim 1, wherein the new configurations are generated by a learning machine component.

3. The medical imaging system of claim 1, wherein one or more portions of the virtual display are reconfigurable via one or more of the user interface and the workflow.

4. The medical imaging system of claim 1, wherein functionality of the user interface is extendable through API integration of external programs.

5. The medical imaging system of claim 1, wherein the view controller module is further configured to detect features within the medical data.

6. The medical imaging system of claim 1, wherein the worklist module is configured to present different queues of work for different users.

7. The medical imaging system of claim 1, wherein the user interface comprises an eye-tracking function, wherein the eye-tracking function is configured to adjust a viewing angle of the virtual display according to a detected viewing angle.

8. The medical imaging system of claim 1, further comprising a communications component for engaging one or more additional users in a collaboration session.

9. The medical imaging system of claim 8, wherein the one or more additional users are students, interns, trainees, residents, or physicians wherein an initiator of the collaboration session can optionally select data and data configurations and presentations for sharing within the collaboration session.

10. The medical imaging system of claim 8, wherein the collaboration session is initiated for the purpose of communication of medical information and diagnoses to one or more patients, wherein an initiator of the collaboration session can optionally select data and data configurations and presentations for sharing within the collaboration session.

11. The medical imaging system of claim 8, wherein the collaboration session is initiated for the purpose of professional consultation on an interpretation of a medical condition.

12. The medical imaging system of claim 8, wherein the collaboration session is initiated for the purpose of a group consultation on one or more medical cases, conditions, and technologies.

13. The medical imaging system of claim 1, wherein the user interface controls a plurality of digital image tools configured for one or a combination of manipulation, processing, annotation, and measurement of features within one or more object displayed by the virtual display.

14. The medical imaging system of claim 13, wherein the plurality of digital image manipulation tools further includes measurement tools for selecting a region of interest within the displayed object and measuring the selected region of interest.

15. The medical imaging system of claim 14, wherein the measurement tools comprise a tool for measuring pixel values and converting pixel values to clinical values.

16. The medical imaging system of claim 13, wherein the user interface comprises a gesture-tracking function, and wherein at least a portion of the plurality of digital image manipulation tools is configured to respond to gestures.

17. The medical image system of claim 13, wherein the displayed object is a 3D or 4D object and the plurality of digital image manipulation tools are configured to define a 3D or 4D voxel-based region of interest (ROI).

18. The medical imaging system of claim 13, wherein the plurality of digital image tools is expandable through registration or inclusion of one or more new functionality through the use of defined interfaces.

19. The medical image system of claim 1, wherein the medical data comprises one or more of DICOM, PACS, RIS and EMR data.

20. A medical imaging system for executing workflow, the system comprising:
a data services module configured to receive medical and operational data from one or more sources;
a worklist module in communication with the data services module, configured for presentation of at least one queue of work to be performed within the workflow;
a view controller module in communication with the data services and worklist modules, the view controller configured to apply one or more protocols for the processing and presentation of the medical data for interpretation, and the generation of an output comprising a display configuration, wherein the one or more protocol definitions are stored within a protocol component within the view controller module;
one or more virtual reality (VR) imaging devices in communication with the view controller module and configured to receive the display configuration and to generate a virtual display of one or more displayed object comprising one or a combination of 1D, 2D, 3D and 4D representations of the medical data; and
a user interface associated with the one or more virtual reality imaging devices, the user interface configured to control features of the display configuration.

21. The medical imaging system of claim 20, wherein the view controller module is further configured to detect features within the medical data.

22. The medical imaging system of claim 20, wherein the worklist module is configured to present different queues of work for different users.

23. The medical imaging system of claim 20, wherein the new protocol configurations are generated by a machine learning component.

24. The medical imaging system of claim 20, wherein one or more portions of the virtual display are reconfigurable via one or more of the user interface and the workflow.

25. The medical imaging system of claim 20, wherein functionality of the user interface is extendable through API integration of external programs.

26. The medical imaging system of claim 20, wherein the user interface includes an eye-tracking function, wherein the eye-tracking function is configured to adjust a viewing angle of the virtual display according to a detected viewing angle.

27. The medical imaging system of claim 20, further comprising a communications component for engaging one or more additional users in a collaboration session.

28. The medical imaging system of claim 27, wherein the collaboration session is initiated for the purposes of medical education to one or more students, wherein an initiator of the collaboration session can optionally select data and data configurations and presentations for sharing within the collaboration session.

29. The medical imaging system of claim 27 wherein the collaboration session is initiated for the purpose of communication of medical information and diagnoses to one or more patients, wherein an initiator of the collaboration session can optionally select data and data configurations and presentations for sharing within the collaboration session.

30. The medical imaging system of claim 27, wherein the collaboration session is initiated for the purpose of professional consultation on the interpretation of a medical condition.

31. The medical imaging system of claim 27, wherein the collaboration session is initiated for the purpose of a group consultation on one or more medical cases, conditions, or technologies.

32. The medical imaging system of claim 20, wherein the user interface controls a plurality of digital image tools configured for one or a combination of manipulation, processing, annotation, and measurement of features within the one or more displayed object.

33. The medical imaging system of claim 32, wherein the plurality of digital image tools is configured for one or a combination of manipulation, processing, annotation, and measurement of features within the one or more displayed object.

34. The medical imaging system of claim 32, wherein the user interface comprises a gesture-tracking function, and wherein at least a portion of the plurality of digital image tools is configured to respond to gestures.

35. The medical imaging system of claim 32, wherein the plurality of digital image tools is expandable through registration or inclusion of one or more new functionality through the use of defined interfaces.

36. The medical imaging system of claim 32, wherein the plurality of digital image tools further comprises measurement tools for selecting a region of interest within the displayed object and measuring the selected region of interest using configured functions designed for clinical interpretation of medical data.

37. The medical imaging system of claim 36, wherein the measurement tools comprise a tool for measuring pixel values and converting pixel values to clinical values.

38. The medical imaging system of claim 32, wherein the plurality of digital image tools is configured to be constrained to one or more selected regions of interest within the displayed object.

39. The medical imaging system of claim 32, wherein the displayed object is a 3D or 4D object and the plurality of digital image tools is configured to define a 3D or 4D voxel-based region of interest.

40. The medical image system of claim 20, wherein the medical data comprises one or more of DICOM, PACS, RIS and EMR data.

\* \* \* \* \*